United States Patent
Li et al.

(10) Patent No.: US 12,537,736 B2
(45) Date of Patent: Jan. 27, 2026

(54) BROADBAND CONNECTION METHOD AND APPARATUS

(71) Applicant: Huawei Technologies Co., Ltd., Shenzhen (CN)

(72) Inventors: Zuqing Li, Shenzhen (CN); Tao Peng, Nanjing (CN); Zhouyi Yu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 357 days.

(21) Appl. No.: 18/309,326

(22) Filed: Apr. 28, 2023

(65) Prior Publication Data

US 2023/0269130 A1    Aug. 24, 2023

Related U.S. Application Data

(63) Continuation of application No. PCT/CN2021/126488, filed on Oct. 26, 2021.

(30) Foreign Application Priority Data

Oct. 31, 2020 (CN) .......................... 202011197333.X

(51) Int. Cl.
*H04L 41/0663* (2022.01)
(52) U.S. Cl.
CPC ................. *H04L 41/0663* (2013.01)
(58) Field of Classification Search
CPC ............... H04L 41/0663; H04L 45/645; H04L 12/4604; H04L 12/4641; H04L 45/302; H04L 45/586; H04L 45/76; H04L 2012/4629; H04L 12/2859; H04L 41/40; H04L 45/28; H04L 45/42; H04L 12/2856; H04L 41/0631; H04L 41/0654; H04W 36/13

See application file for complete search history.

(56) References Cited

U.S. PATENT DOCUMENTS

2020/0119993 A1*   4/2020   Gandhewar ......... H04L 43/0817

FOREIGN PATENT DOCUMENTS

| CN | 108512703 A | * | 9/2018 | ......... H04L 41/0663 |
| CN | 108667575 A | * | 10/2018 | ............... H04L 1/22 |
| CN | 108667695 A | * | 10/2018 | ............. H04L 45/22 |
| CN | 110166270 A | | 8/2019 | |
| EP | 3731464 A1 | * | 10/2020 | ............. H04L 41/40 |
| WO | 2020216339 A1 | | 10/2020 | |

* cited by examiner

*Primary Examiner* — Paul H. Masur
(74) *Attorney, Agent, or Firm* — Conley Rose, P.C.

(57) ABSTRACT

A broadband connection method includes a virtual broadband network gateway (vBNG)-control plane (CP) that receives first indication information from a user plane selection function (USF), where the first indication information indicates a second vBNG-user plane (UP) that replaces a first vBNG-UP when the first vBNG-UP is faulty. The vBNG-CP sends a user entry to the second vBNG-UP based on the first indication information, where the user entry is used by the second vBNG-UP to enable a user to access a network based on the user entry when the first vBNG-UP is faulty such that when a user plane is faulty, broadband access of a user is not interrupted, and the user can continue to access a network.

20 Claims, 14 Drawing Sheets

BROADBAND CONNECTION METHOD AND APPARATUS

CROSS-REFERENCE TO RELATED APPLICATIONS

This application is a continuation application of International Patent Application No. PCT/CN2021/126488 filed on Oct. 26, 2021, which claims priority to Chinese Patent Application No. 202011197333.X filed on Oct. 31, 2020. The disclosures of the aforementioned applications are hereby incorporated by reference in their entireties.

TECHNICAL FIELD

This application relates to the field of communication technologies, and in particular, to a broadband connection method and an apparatus.

BACKGROUND

With the development of a software-defined networking (SDN) technology and a network function virtualization (NFV) technology, a metropolitan area network evolves from a conventional network-centric architecture to a data center-centric network architecture. Conventional network element devices also evolve from professional devices to universal devices. Two types of decoupling are to be mainly resolved during the evolution of the conventional network element devices from professional devices to universal devices: decoupling of control and forwarding, and decoupling of software and hardware.

Broadband access network devices (broadcast network gateways (BNGs)/virtual BNGs (vBNGs)) are very important in user broadband access services and scenarios. Main requirements for user access of BNG devices are user authentication, access control, traffic scheduling, and the like. With the emergence of various internet services, a requirement for a quantity of user sessions supported by the BNG devices is continuously increased, a requirement for a user access bandwidth is continuously increased, and in particular, a requirement for the BNG devices to externally improve service development and programmability is increasingly high. Based on these factors, the BNG devices implement the foregoing two types of decoupling based on an SDN/NFV architecture.

After BNG forwarding and control are decoupled, a control plane may manage a plurality of forwarding planes and flexibly schedule users, traffic, and resources among the plurality of forwarding planes. Compared with a single device, device utilization and reliability can be greatly improved. However, when a user plane is faulty, users can access a new user plane to restore traffic only after the users go offline and re-dial up. The restoration takes a long time, affecting user experience.

SUMMARY

Embodiments of this application provide a broadband connection method and a related apparatus, so that when a user plane is faulty, broadband access of a user is not interrupted, and the user can continue to access a network.

According to a first aspect, an embodiment of this application provides a broadband connection method. In the method, a vBNG-control plane (CP) receives first indication information from a user plane selection function (USF), where the first indication information indicates a second vBNG-user plane (UP) that replaces a first vBNG-UP when the first vBNG-UP is faulty. The vBNG-CP sends a user entry to the second vBNG-UP based on the first indication information. The user entry may include related information used by the second vBNG-UP to enable a user to access a network based on the user entry when the second vBNG-UP learns that the first vBNG-UP is faulty.

In the foregoing solution, the vBNG-CP may obtain, in advance, a target user plane (the second vBNG-UP) to which the user affected by a fault of a first user plane needs to be migrated. Therefore, the vBNG-CP may send the user entry to the second vBNG-UP in advance. In this way, when the first user plane is faulty, time for sending the user entry to the second vBNG-UP can be reduced, and a speed of steering user traffic from the first vBNG-UP to the second vBNG-UP can be improved.

In a specific implementation of the first aspect, before that a vBNG-CP receives first indication information from a USF, the vBNG-CP may obtain fault information of the first vBNG-UP. The vBNG-CP may further send first notification information to the USF, where the first notification information is used to notify that the first vBNG-UP is faulty.

In the foregoing solution, the vBNG-CP may monitor a status of a connection to the first vBNG-UP in real time, so that the vBNG-CP can perceive, in real time, that the first vBNG-UP is faulty. When the first vBNG-UP is faulty, the vBNG-CP may send a fault message to the USF, so that the USF can query the target user plane for migration.

In a specific implementation of the first aspect, after that a vBNG-CP receives first indication information from a USF, and before that the vBNG-CP sends a user entry to the second vBNG-UP based on the first indication information, the vBNG-CP may further obtain fault information of the first vBNG-UP.

In a specific implementation of the first aspect, after that a vBNG-CP receives first indication information from a USF, and before that the vBNG-CP sends a user entry to the second vBNG-UP based on the first indication information, the method further includes the following. The vBNG-CP receives a notification message sent by the second vBNG-UP after user traffic is migrated from the first vBNG-UP to the second vBNG-UP, where the notification message indicates the vBNG-CP to send the user entry to the second vBNG-UP.

In a specific implementation of the first aspect, after that the vBNG-CP sends a user entry to the second vBNG-UP based on the first indication information, the vBNG-CP may send a first migration request to an SDN controller, where the first migration request is used to request to migrate user traffic from the first vBNG-UP to the second vBNG-UP.

In a specific implementation of the first aspect, after that the vBNG-CP sends a user entry to the second vBNG-UP, the method further includes the following. The vBNG-CP sends, to the USF, a notification message indicating that the user entry is successfully migrated, where the notification message is used by the USF to trigger an SDN controller to migrate user traffic from the first vBNG-UP to the second vBNG-UP.

According to a second aspect, an embodiment of this application provides a broadband connection method. In the method, an SDN controller receives a first migration request, where the first migration request is used to request to migrate user traffic from a first vBNG-UP to a second vBNG-UP when the first vBNG-UP is faulty. The SDN controller controls a steering function (SF) to further migrate the user traffic from the first vBNG-UP to the second vBNG-UP.

In the foregoing solution, the SDN controller may migrate the user traffic from the first vBNG-UP to the second vBNG-UP when the first vBNG-UP is faulty, to ensure that a user does not perceive the fault of the first vBNG-UP, maintain a broadband connection of the user uninterrupted, and improve user satisfaction.

In a specific implementation of the second aspect, before that an SDN controller receives a first migration request, the SDN controller may obtain fault information of the first vBNG-UP. The SDN controller may further send first notification information to a USF, where the first notification information is used to notify that the first vBNG-UP is faulty.

In the foregoing solution, the SDN controller may monitor a status of a connection to the first vBNG-UP in real time, so that the SDN controller can perceive, in real time, that the first vBNG-UP is faulty. When the first vBNG-UP is faulty, the SDN controller may send a fault message to the USF, so that the USF can query a target user plane for migration.

In a specific implementation of the second aspect, the first migration request is from a vBNG-CP or the USF.

In a specific implementation of the second aspect, that the SDN controller controls an SF to migrate the user traffic from the first vBNG-UP to the second vBNG-UP is represented as follows. The SDN controller sends path information of the second vBNG-UP to the SF, to control the SF to migrate the user traffic from the first vBNG-UP to the second vBNG-UP, where the path information is used by the SF to migrate the user traffic from the first vBNG-UP to the second vBNG-UP.

In a specific implementation of the second aspect, that the SDN controller controls an SF to migrate the user traffic from the first vBNG-UP to the second vBNG-UP is represented as follows. The SDN controller controls the SF to bind a virtual local area network (VLAN) or a double-layer VLAN (QinQ) corresponding to a user to an interface corresponding to the second vBNG-UP, to migrate the user traffic from the first vBNG-UP to the second vBNG-UP.

According to a third aspect, an embodiment of this application provides a broadband connection method. In the method, a USF determines a second vBNG-UP, where the second vBNG-UP is a vBNG-UP that replaces the first vBNG-UP to maintain a broadband connection of a user uninterrupted after the first vBNG-UP is faulty. The USF sends first indication information to a vBNG-CP, where the first indication information indicates the second vBNG-UP that replaces the first vBNG-UP when the first vBNG-UP is faulty.

In the foregoing solution, the USF may determine, based on various requirements, a target user plane that meets load balancing, so that the target user plane (the second vBNG-UP) may replace the faulty vBNG-UP when the first vBNG-UP is faulty. This improves network utilization and efficiency, and improves user satisfaction.

In a specific implementation of the third aspect, before that a USF determines a second vBNG-UP, the USF may receive a first notification message, where the first notification message is used to notify that the first vBNG-UP is faulty.

In a specific implementation of the third aspect, after that a USF determines a second vBNG-UP, the USF may send a first migration request to an SDN controller, where the first migration request is used to request to migrate user traffic from the first vBNG-UP to the second vBNG-UP when the first vBNG-UP is faulty.

In a specific implementation of the third aspect, after that the USF sends first indication information to a vBNG-CP, the USF may receive a second notification message from the vBNG-CP, where the second notification message indicates that the vBNG-CP has sent a user entry to the second vBNG-UP. The USF may send a first migration request to an SDN controller based on the second notification message, where the first migration request is used by the SDN controller to migrate user traffic from the first vBNG-UP to the second vBNG-UP. The user entry is used by the second vBNG-UP to enable the user to access a network based on the user entry when the first vBNG-UP is faulty.

In a specific implementation of the third aspect, the first notification message may be from the vBNG-CP or an SDN controller.

In a specific implementation of the third aspect, that a USF determines a second vBNG-UP is represented as follows. The USF may determine the second vBNG-UP from a plurality of vBNG-UPs based on a service-level agreement (SLA).

According to a fourth aspect, an embodiment of this application provides a broadband connection method. In the method, an SF may receive path information sent by an SDN controller, where the path information indicates to migrate user traffic from a first vBNG-UP to a second vBNG-UP when the first vBNG-UP is faulty. The SF may further obtain fault information of the first vBNG-UP. The SF may further migrate the user traffic from the first vBNG-UP to the second vBNG-UP based on the path information.

In the foregoing solution, the SF may monitor a status of a connection to the first vBNG-UP in real time, so that the SF can perceive, in real time, that the first vBNG-UP is faulty. When the first vBNG-UP is faulty, the user traffic can be quickly migrated from the faulty first vBNG-UP to a target user plane (the second vBNG-UP). Traffic migration is completed when a user does not perceive the fault of the first vBNG-UP, to improve user experience.

In a specific implementation of the fourth aspect, that the SF migrates the user traffic from the first vBNG-UP to the second vBNG-UP is further represented as follows. The SF may bind, based on the path information, a VLAN or a QinQ corresponding to a user to an interface corresponding to the second vBNG-UP, to complete migration of the user traffic from the first vBNG-UP to the second vBNG-UP.

According to a fifth aspect, an embodiment of this application provides a vBNG-CP apparatus. In the apparatus, a receiving unit is configured to receive first indication information from a USF, where the first indication information indicates a second vBNG-UP that replaces a first vBNG-UP when the first vBNG-UP is faulty. A processing unit is configured to send a user entry to the second vBNG-UP based on the first indication information, where the user entry is used by the second vBNG-UP to enable a user to access a network based on the user entry when the first vBNG-UP is faulty. In a specific implementation of the fifth aspect, before the receiving unit is configured to receive the first indication information from the USF, the receiving unit is further configured to obtain fault information of the first vBNG-UP, and the apparatus may further include a sending unit configured to send first notification information to the USF, where the first notification information is used to notify that the first vBNG-UP is faulty.

In a specific implementation of the fifth aspect, after the receiving unit is configured to receive the first indication information from the USF, and after the processing unit is configured to send the user entry to the second vBNG-UP based on the first indication information, the receiving unit is further configured to obtain fault information of the first vBNG-UP.

In a specific implementation of the fifth aspect, after the receiving unit is configured to receive the first indication information from the USF, and after the processing unit is configured to send the user entry to the second vBNG-UP based on the first indication information, the receiving unit is further configured to receive a notification message sent by the second vBNG-UP after user traffic is migrated from the first vBNG-UP to the second vBNG-UP, where the notification message indicates the vBNG-CP to send the user entry to the second vBNG-UP.

In a specific implementation of the fifth aspect, after the processing unit is configured to send the user entry to the second vBNG-UP based on the first indication information, the apparatus may further include the sending unit configured to send a first migration request to an SDN controller, where the first migration request is used to request to migrate user traffic from the first vBNG-UP to the second vBNG-UP.

In a specific implementation of the fifth aspect, after the processing unit is configured to send the user entry to the second vBNG-UP based on the first indication information, the apparatus may further include the sending unit configured to send, to the USF, a notification message indicating that the user entry is successfully migrated, where the notification message is used by the USF to trigger an SDN controller to migrate user traffic from the first vBNG-UP to the second vBNG-UP.

For technical effects brought by the fifth aspect or the specific implementations, refer to the descriptions of the technical effects brought by the first aspect or the corresponding implementations.

According to a sixth aspect, an embodiment of this application provides an SDN controller apparatus. In the apparatus, a receiving unit is configured to receive a first migration request, where the first migration request is used to request to migrate user traffic from a first vBNG-UP to a second vBNG-UP when the first vBNG-UP is faulty. A processing unit is configured to control a SF to migrate the user traffic from the first vBNG-UP to the second vBNG-UP.

In a specific implementation of the sixth aspect, before the receiving unit is configured to receive the first migration request, the receiving unit is further configured to obtain fault information of the first vBNG-UP. The apparatus may further include a sending unit configured to send first notification information to a USF, where the first notification information is used to notify that the first vBNG-UP is faulty.

In a specific implementation of the sixth aspect, the first migration request may be from a vBNG-CP or the USF.

In a specific implementation of the sixth aspect, the processing unit is further configured to send path information of the second vBNG-UP to the SF, to control the SF to migrate the user traffic from the first vBNG-UP to the second vBNG-UP, where the path information is used by the SF to migrate the user traffic from the first vBNG-UP to the second vBNG-UP.

In a specific implementation of the sixth aspect, the processing unit is further configured to control the SF to bind a VLAN or a QinQ corresponding to a user to an interface corresponding to the second vBNG-UP, to migrate the user traffic from the first vBNG-UP to the second vBNG-UP.

For technical effects brought by the sixth aspect or the possible implementations, refer to the descriptions of the technical effects brought by the second aspect or the corresponding implementations.

According to a seventh aspect, an embodiment of this application provides a USF apparatus. In the apparatus, a processing unit is configured to determine a second vBNG-UP, where the second vBNG-UP is a vBNG-UP that replaces a first vBNG-UP to enable a user to access a network after the first vBNG-UP is faulty. A sending unit is configured to send first indication information to a vBNG-CP, where the first indication information indicates the second vBNG-UP that replaces the first vBNG-UP when the first vBNG-UP is faulty.

In a specific implementation of the seventh aspect, before the processing unit is configured to determine the second vBNG-UP, the apparatus further includes a receiving unit configured to receive a first notification message, where the first notification message is used to notify that the first vBNG-UP is faulty.

In a specific implementation of the seventh aspect, after the processing unit is configured to determine the second vBNG-UP, the sending unit may be further configured to send a first migration request to an SDN controller, where the first migration request is used to request to migrate user traffic from the first vBNG-UP to the second vBNG-UP when the first vBNG-UP is faulty.

In a specific implementation of the seventh aspect, after the sending unit is configured to send the first indication information to the vBNG-CP, the receiving unit may be further configured to receive a second notification message from the vBNG-CP, where the second notification message indicates that the vBNG-CP has sent a user entry to the second vBNG-UP, and the sending unit may be further configured to send a first migration request to an SDN controller based on the second notification message, where the first migration request is used by the SDN controller to migrate user traffic from the first vBNG-UP to the second vBNG-UP, the user entry is information indicating that the user accesses the network through the second vBNG-UP, and the user entry is used by the second vBNG-UP to maintain a broadband connection of the user when the first vBNG-UP is faulty.

In a specific implementation of the seventh aspect, the first notification message may be from the vBNG-CP or an SDN controller.

In a specific implementation of the seventh aspect, the processing unit is further configured to determine the second vBNG-UP from a plurality of vBNG-UPs based on an SLA.

For technical effects brought by the seventh aspect or the possible implementations, refer to the descriptions of the technical effects brought by the third aspect or the corresponding implementations.

According to an eighth aspect, an embodiment of this application provides an SF apparatus. In the apparatus, a receiving unit is configured to receive path information sent by an SDN controller, where the path information indicates to migrate user traffic from a first vBNG-UP to a second vBNG-UP when the first vBNG-UP is faulty. An obtaining unit is configured to obtain fault information of the first vBNG-UP. A processing unit is configured to migrate the user traffic from the first vBNG-UP to the second vBNG-UP based on the path information.

In a specific implementation of the eighth aspect, the processing unit is further configured to bind, based on the path information, a VLAN or a QinQ corresponding to a user to an interface corresponding to the second vBNG-UP, to complete migration of the user traffic from the first vBNG-UP to the second vBNG-UP.

For technical effects brought by the eighth aspect or the possible implementations, refer to the descriptions of the technical effects brought by the fourth aspect or the corresponding implementations.

According to a ninth aspect, an embodiment of this application provides a broadband connection system, including a vBNG-CP apparatus and a USF apparatus. In the system, the USF apparatus is configured to send first indication information to the vBNG-CP apparatus, where the first indication information indicates a second vBNG-UP that replaces a first vBNG-UP when the first vBNG-UP is faulty.

The vBNG-CP apparatus is configured to send a user entry to the second vBNG-UP based on the first indication information, where the user entry is information indicating that a user accesses a network through the second vBNG-UP, and the user entry is used by the second vBNG-UP to enable the user to access the network based on the user entry when the first vBNG-UP is faulty.

In a specific implementation of the ninth aspect, the system further includes an SDN controller configured to receive a first migration request, where the first migration request is used to request to migrate user traffic from the first vBNG-UP to the second vBNG-UP when the first vBNG-UP is faulty, and an SF apparatus configured to migrate the user traffic from the first vBNG-UP to the second vBNG-UP based on path information, where the path information indicates to migrate the user traffic from the first vBNG-UP to the second vBNG-UP when the first vBNG-UP is faulty.

In a specific implementation of the ninth aspect, before the USF apparatus is configured to send the first indication information to the vBNG-CP apparatus, the vBNG-CP apparatus is further configured to obtain fault information of the first vBNG-UP.

The vBNG-CP apparatus is further configured to send first notification information to the USF, where the first notification information is used to notify that the first vBNG-UP is faulty.

In a specific implementation of the ninth aspect, after the USF apparatus is configured to send the first indication information to the vBNG-CP apparatus, and before the vBNG-CP apparatus is configured to send the user entry to the second vBNG-UP based on the first indication information, the vBNG-CP apparatus is further configured to obtain fault information of the first vBNG-UP.

In a specific implementation of the ninth aspect, after the USF apparatus is configured to send the first indication information to the vBNG-CP apparatus, and before the vBNG-CP apparatus is configured to send the user entry to the second vBNG-UP based on the first indication information, the vBNG-CP apparatus is further configured to receive a notification message sent by the second vBNG-UP after user traffic is migrated from the first vBNG-UP to the second vBNG-UP, where the notification message indicates the vBNG-CP to send the user entry to the second vBNG-UP.

In a specific implementation of the ninth aspect, after the vBNG-CP apparatus is configured to send the user entry to the second vBNG-UP based on the first indication information, the vBNG-CP apparatus is further configured to send a first migration request to an SDN controller, where the first migration request is used to request to migrate user traffic from the first vBNG-UP to the second vBNG-UP.

In a specific implementation of the ninth aspect, after the vBNG-CP apparatus is configured to send the user entry to the second vBNG-UP based on the first indication information, the vBNG-CP apparatus is further configured to send, to the USF, a notification message indicating that the user entry is successfully migrated, where the notification message is used by the USF to trigger an SDN controller to migrate user traffic from the first vBNG-UP to the second vBNG-UP.

In a specific implementation of the ninth aspect, the USF apparatus is further configured to determine the second vBNG-UP.

In a specific implementation of the ninth aspect, before the USF apparatus is configured to determine the second vBNG-UP, the USF apparatus may be further configured to receive a first notification message, where the first notification message is used to notify that the first vBNG-UP is faulty.

In a specific implementation of the ninth aspect, after the USF apparatus is configured to determine the second vBNG-UP, the USF apparatus may be further configured to send a first migration request to an SDN controller, where the first migration request is used to request to migrate user traffic from the first vBNG-UP to the second vBNG-UP when the first vBNG-UP is faulty.

In a specific implementation of the ninth aspect, after the USF apparatus is configured to determine the second vBNG-UP, the USF apparatus may be further configured to receive a second notification message from the vBNG-CP, where the second notification message indicates that the vBNG-CP has sent a user entry to the second vBNG-UP.

The USF apparatus may be further configured to send a first migration request to an SDN controller based on the second notification message.

In a specific implementation of the ninth aspect, the USF apparatus may be further configured to determine the second vBNG-UP from a plurality of vBNG-UPs based on an SLA.

In a specific implementation of the ninth aspect, before the SDN controller is configured to receive the first migration request, the SDN controller is further configured to obtain fault information of the first vBNG-UP.

The SDN controller is further configured to send first notification information to the USF, where the first notification information is used to notify that the first vBNG-UP is faulty.

In a specific implementation of the ninth aspect, the SDN controller may be further configured to control an SF to migrate the user traffic from the first vBNG-UP to the second vBNG-UP.

In a specific implementation of the ninth aspect, the SDN controller is further configured to send path information of the second vBNG-UP to the SF, to control the SF to migrate the user traffic from the first vBNG-UP to the second vBNG-UP, where the path information is used by the SF to migrate the user traffic from the first vBNG-UP to the second vBNG-UP.

In a specific implementation of the ninth aspect, the SDN controller is further configured to control the SF to bind a VLAN or a QinQ corresponding to a user to an interface corresponding to the second vBNG-UP, to migrate the user traffic from the first vBNG-UP to the second vBNG-UP.

In a specific implementation of the ninth aspect, the SF may be further configured to receive the path information sent by the SDN controller.

In a specific implementation of the ninth aspect, the SF may be further configured to obtain fault information of the first vBNG-UP.

In a specific implementation of the ninth aspect, the SF may be further configured to bind, based on the path information, a VLAN or a QinQ corresponding to a user to an interface corresponding to the second vBNG-UP, to complete migration of the user traffic from the first vBNG-UP to the second vBNG-UP.

For technical effects brought by the ninth aspect or the possible implementations, refer to the descriptions of the technical effects of any implementation of the first aspect, the second aspect, the third aspect, or the fourth aspect.

According to a tenth aspect, an embodiment of this application provides a vBNG-CP device. The device includes at least one processor and a communication interface, the communication interface is configured to send and/or receive data, and the at least one processor is configured to invoke a computer program stored in at least one memory, so that the device implements the method described in any one of the first aspect or the specific implementations of the first aspect.

For technical effects brought by the tenth aspect or the possible implementations, refer to the descriptions of the technical effects brought by the first aspect or the corresponding implementations.

According to an eleventh aspect, an embodiment of this application provides an SDN controller device. The device includes at least one processor and a communication interface, the communication interface is configured to send and/or receive data, and the at least one processor is configured to invoke a computer program stored in at least one memory, so that the device implements the method described in any one of the second aspect or the specific implementations of the second aspect.

For technical effects brought by the eleventh aspect or the possible implementations, refer to the descriptions of the technical effects brought by the second aspect or the corresponding implementations.

According to a twelfth aspect, an embodiment of this application provides a USF device. The device includes at least one processor and a communication interface, the communication interface is configured to send and/or receive data, and the at least one processor is configured to invoke a computer program stored in at least one memory, so that the device implements the method described in any one of the third aspect or the specific implementations of the third aspect.

For technical effects brought by the twelfth aspect or the possible implementations, refer to the descriptions of the technical effects brought by the third aspect or the corresponding implementations.

According to a thirteenth aspect, an embodiment of this application provides an SF device. The device includes at least one processor and a communication interface, the communication interface is configured to send and/or receive data, and the at least one processor is configured to invoke a computer program stored in at least one memory, so that the device implements the method described in any one of the second aspect or the specific implementations of the second aspect.

For technical effects brought by the thirteenth aspect or the possible implementations, refer to the descriptions of the technical effects brought by the fourth aspect or the corresponding implementations.

According to a fourteenth aspect, an embodiment of this application provides a computer-readable storage medium. The computer-readable storage medium stores a computer program. When the computer program is run on one or more processors, the method described in any one of the first aspect or the specific implementations of the first aspect, any one of the second aspect or the specific implementations of the second aspect, any one of the third aspect or the specific implementations of the third aspect, or any one of the fourth aspect or the specific implementations of the fourth aspect is performed.

According to a fifteenth aspect, an embodiment of this application provides a computer program product. When the computer program product runs on one or more processors, the method described in any one of the first aspect or the specific implementations of the first aspect, any one of the second aspect or the specific implementations of the second aspect, any one of the third aspect or the specific implementations of the third aspect, or any one of the fourth aspect or the specific implementations of the fourth aspect is performed.

According to a sixteenth aspect, an embodiment of this application provides a chip system. The chip system includes at least one processor, a memory, and an interface circuit. The interface circuit is configured to provide information input/output for the at least one processor. The memory stores a computer program. When the computer program is run on one or more processors, the method described in any one of the first aspect or the specific implementations of the first aspect is performed.

According to a seventeenth aspect, an embodiment of this application provides a chip system. The chip system includes at least one processor, a memory, and an interface circuit. The interface circuit is configured to provide information input/output for the at least one processor. The memory stores a computer program. When the computer program is run on one or more processors, the method described in any one of the second aspect or the specific implementations of the second aspect is performed.

According to an eighteenth aspect, an embodiment of this application provides a chip system. The chip system includes at least one processor, a memory, and an interface circuit. The interface circuit is configured to provide information input/output for the at least one processor. The memory stores a computer program. When the computer program is run on one or more processors, the method described in any one of the third aspect or the specific implementations of the third aspect is performed.

According to a nineteenth aspect, an embodiment of this application provides a chip system. The chip system includes at least one processor, a memory, and an interface circuit. The interface circuit is configured to provide information input/output for the at least one processor. The memory stores a computer program. When the computer program is run on one or more processors, the method described in any one of the fourth aspect or the specific implementations of the fourth aspect is performed.

BRIEF DESCRIPTION OF DRAWINGS

The following describes the accompanying drawings used in embodiments of this application.

DESCRIPTION OF EMBODIMENTS

Figure 1A:
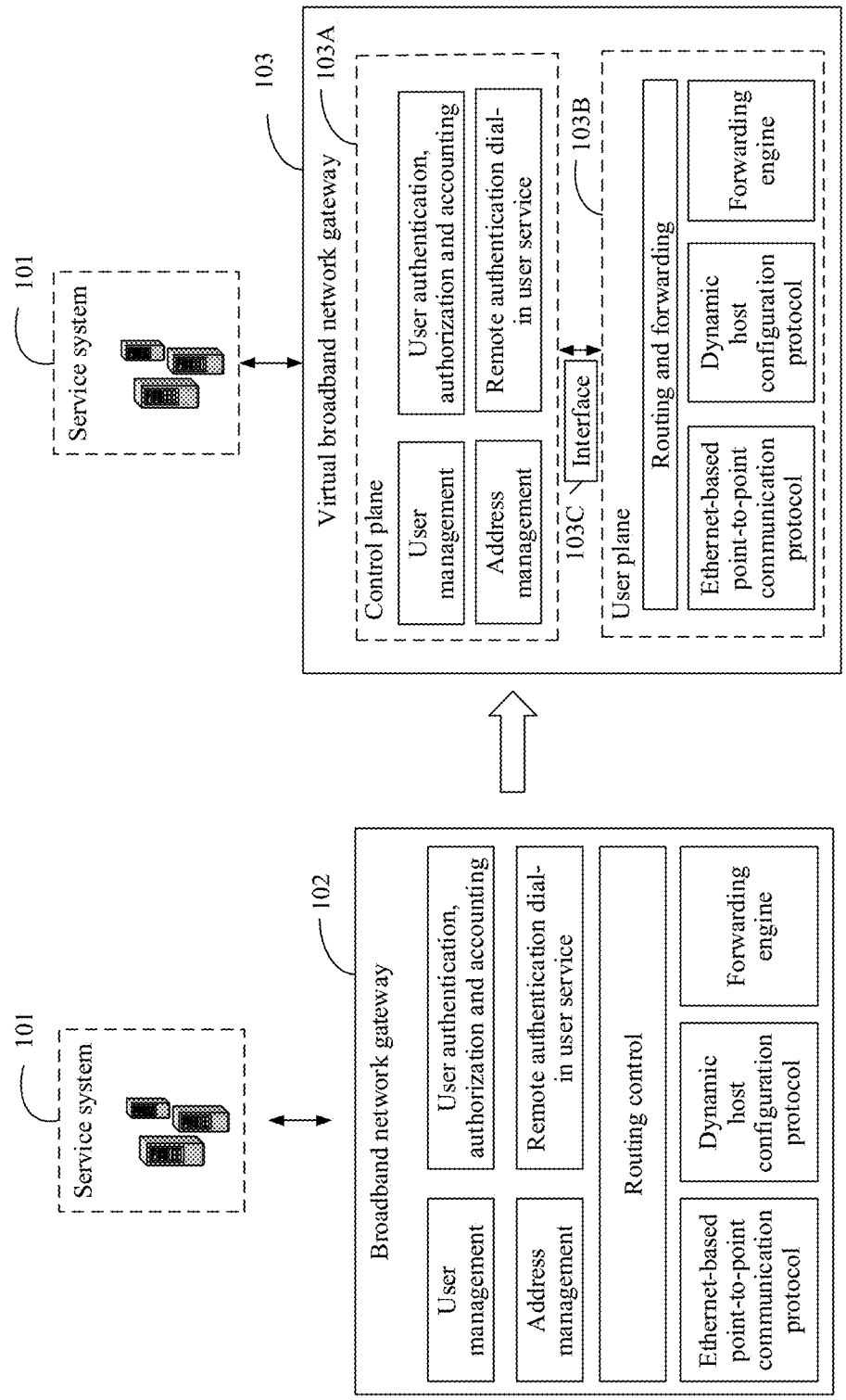
FIG. 1A is a schematic diagram of an architecture of a vBNG according to an embodiment of this application.

The following describes embodiments of this application with reference to the accompanying drawings in embodiments of this application.

1. BNG:

A BNG device is a new type of access gateway oriented to broadband network applications. The BNG device is located at a marginal layer of a backbone network and usually serves as a termination for user access and a providing point for basic services in a metropolitan area network. The BNG device terminates a Point-to-Point Protocol over Ethernet (PPPoE) connection of a user, aggregates user traffic, and cooperates with an authentication system, an accounting system, a customer management system, and a service policy control system to implement user access authentication, accounting, and management functions.

2. vBNG:

A conventional BNG device is usually implemented based on a device integrating software and hardware. When a new service needs to be deployed, BNG devices deployed in different periods cannot implement a same function in a software upgrade manner. Therefore, a vBNG device is introduced in an actual application to implement a function of the BNG device. The vBNG is a virtual device obtained by virtualizing functions of a conventional BNG. Because the vBNG may run in a hardware environment of a general-purpose server, the vBNG implements related functions that can be implemented by the conventional BNG device, reduces upgrade costs during new service deployment, and improves maintainability. For example, during user access, the vBNG may implement user online processing, user authentication, authorization, and accounting (AAA).

3. SDN:

The SDN is an implementation of network virtualization, and is a new innovative network architecture that may define and control a network through software programming. A core technology OPENFLOW of the SDN is to separate a control plane from a data plane of a network device to implement flexible control of network traffic, make the network more intelligent as a pipe, and provide a good platform for core network and application innovation.

The SDN separates data from control based on a hierarchical idea. A control layer includes a logically centralized and programmable controller that may obtain global network information and help operators and scientific research personnel manage and configure networks, deploy new protocols, and the like. A data layer includes a dumb switch (different from a conventional layer 2 switch, where the dumb switch refers to a device for forwarding data) that provides only a simple data forwarding function and may quickly process a matched data packet to meet an increasing traffic requirement. The two layers use an open unified interface (such as OPENFLOW) to interact with each other. The controller delivers a unified standard rule to the switch through a standard interface, and the switch only needs to perform a corresponding action according to the rule.

4. NFV:

The NFV is a concept of a network architecture. Functions of a network node level are divided into several functional blocks by using a virtualization technology, and the functional blocks are separately implemented in a software manner, and are not limited to a hardware architecture.

The concept of the NFV is to unify hardware of a plurality of current communication devices to reduce costs, and virtualize a network device function to a universal hardware platform through software. Software and hardware decoupling and function abstraction may be used. In this way, the network device function is no longer dependent on special-purpose hardware. Resources can be fully and flexibly shared. A new service is quickly developed and deployed. Automatic deployment, flexible scaling, fault isolation, self-healing, and the like are performed based on an actual service requirement.

5. SLA:

In a communication network, to ensure communication service quality, a service provider and a user sign an SLA. The SLA is a formal agreement. The service provider provides a differentiated service for the user based on the SLA and ensures that service quality meets a requirement specified in the SLA. If the service quality violates the SLA, that is, the service quality does not meet the requirement specified in the signed SLA, the service provider compensates or provides a discount for the user based on the SLA.

In an actual application, a same user may require services of different levels in different situations. For example, when an enterprise user subscribes to a virtual private network (VPN) service, the enterprise user needs to ensure a high service level during working hours to ensure normal running of an enterprise user service and is willing to pay a high service fee, and the enterprise user needs a low service level during non-working hours to meet a requirement of non-important work activities and wants to pay a low fee. For another example, in a digital telephone service, an individual user may have an acceptable packet loss rate. However, in some important cases, for example, a video conference, the individual user wants the service provider to provide a high service level and is willing to pay a higher fee.

Therefore, corresponding SLA assurance may be provided based on a service required by the user.

FIG. 1A is a schematic diagram of an architecture of a vBNG according to an embodiment of this application. It can be learned from FIG. 1A that in a forwarding-control (forwarding and control) separation architecture, the vBNG may implement separation between a control plane (vBNG-CP) and a user plane (vBNG-UP) through SDN, and implement decoupling between software and hardware through NFV.

It can be learned from FIG. 1A that a BNG device implements decoupling between a user plane and a control plane based on an SDN/NFV architecture. In an environment of the BNG device in which the control plane is decoupled from the user plane, the control plane (vBNG-CP) of the vBNG may manage dozens or hundreds of user planes (vBNG-UPs) of the vBNG, and schedule users, traffic, and resources between a plurality of user planes. One vBNG-UP may have an average of 100 user access ports. Therefore, one vBNG-CP needs to manage thousands or even tens of thousands of user access ports.

A service system is a peripheral system platform, and may be associated with a vBNG system to provide various services, mainly including one or more of a remote authentication dial-in user service (RADIUS) server, a Dynamic Host Configuration Protocol (DHCP) server, a log server, a portal server, and the like. Further, the service system may be one server, or may be a server cluster including a plurality of servers.

A control plane 103A, which may also be referred to as a vBNG-CP, may be responsible for control domain management of a user, and mainly may implement user access management, policy management, address management, user authentication, authorization and accounting, perform configuration and management in a command mode, a connection to an external service system by using a unified northbound interface, interaction with a management and orchestration (MANO) system (not shown in FIG. 1A) (implementing one-click deployment and elastic scaling of the vBNG-CP), and the like. As a virtual network function (VNF), the vBNG-CP usually uses an x86 server to implement virtualization.

A user plane 103B, which may also be referred to as a vBNG-UP, is responsible for forwarding a user data packet, and main functions include performing functions (traffic forwarding, traffic statistics collection, quality of service (QoS) policy execution, and the like) of a user plane of a conventional BNG device, enabling a VPN, perform configuration and management in a command mode.

An interface 103C may include one or more of a protocol interface, a control interface, and a management interface. The protocol interface may transmit protocol packets such as PPPoE and Internet Protocol (IP) over Ethernet (IPoE) through a virtual extensible local area network (VxLAN) tunnel. The control interface may use OPENFLOW to enable the vBNG-CP to deliver a user entry (or a service flow entry) to the vBNG-UP and enable the vBNG-UP to report a service event to the vBNG-CP. The management interface may enable, through Netconf, the vBNG-CP to deliver a configuration to the vBNG-UP.

Figure 1B:
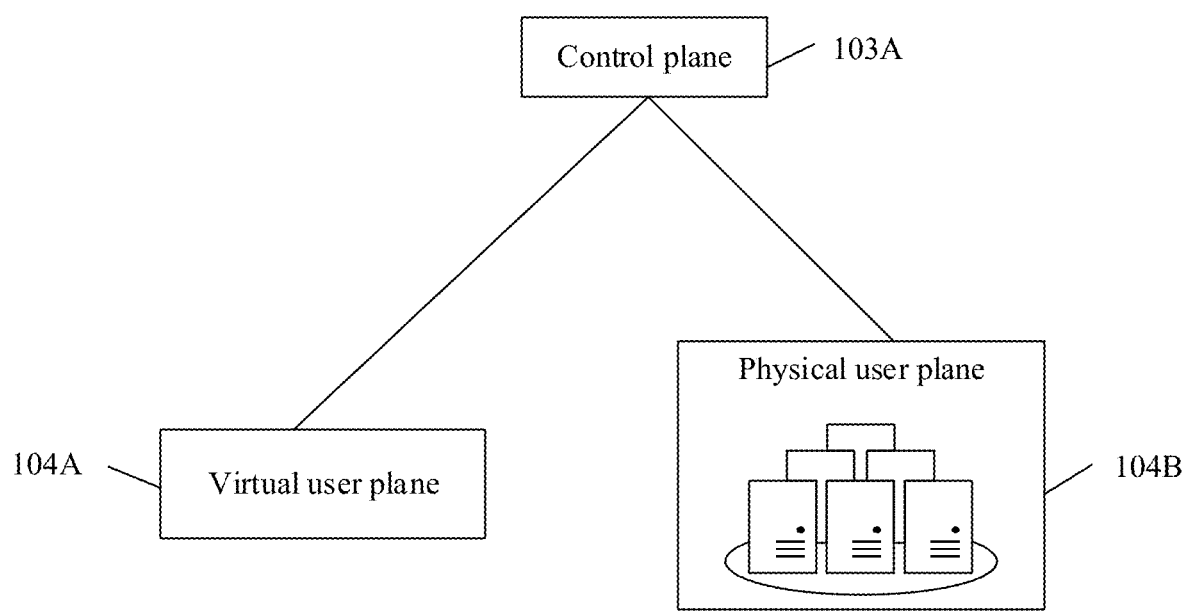
FIG. 1B is a schematic diagram of an architecture of a vBNG-UP according to an embodiment of this application.

FIG. 1B is a schematic diagram of an architecture of a vBNG-UP according to an embodiment of this application. It can be learned from FIG. 1B that the vBNG-UP usually has two forms. One form is a virtual user plane (vUP) 104A. The vUP 104A is used as a VNF, and may be a virtualized network element running on an x86 server. The other form is a physical user plane (pUP) 104B. As a physical network function (PNF), the pUP 104B may be a network element running on a conventional hardware network device. A control plane 103 (vBNG-CP) may be usually configured to manage the vUP and the pUP.

The vBNG-UP may be distributed at a network edge position, or may be distributed at a network center position. This is not limited in this embodiment of this application.

Figure 2A:
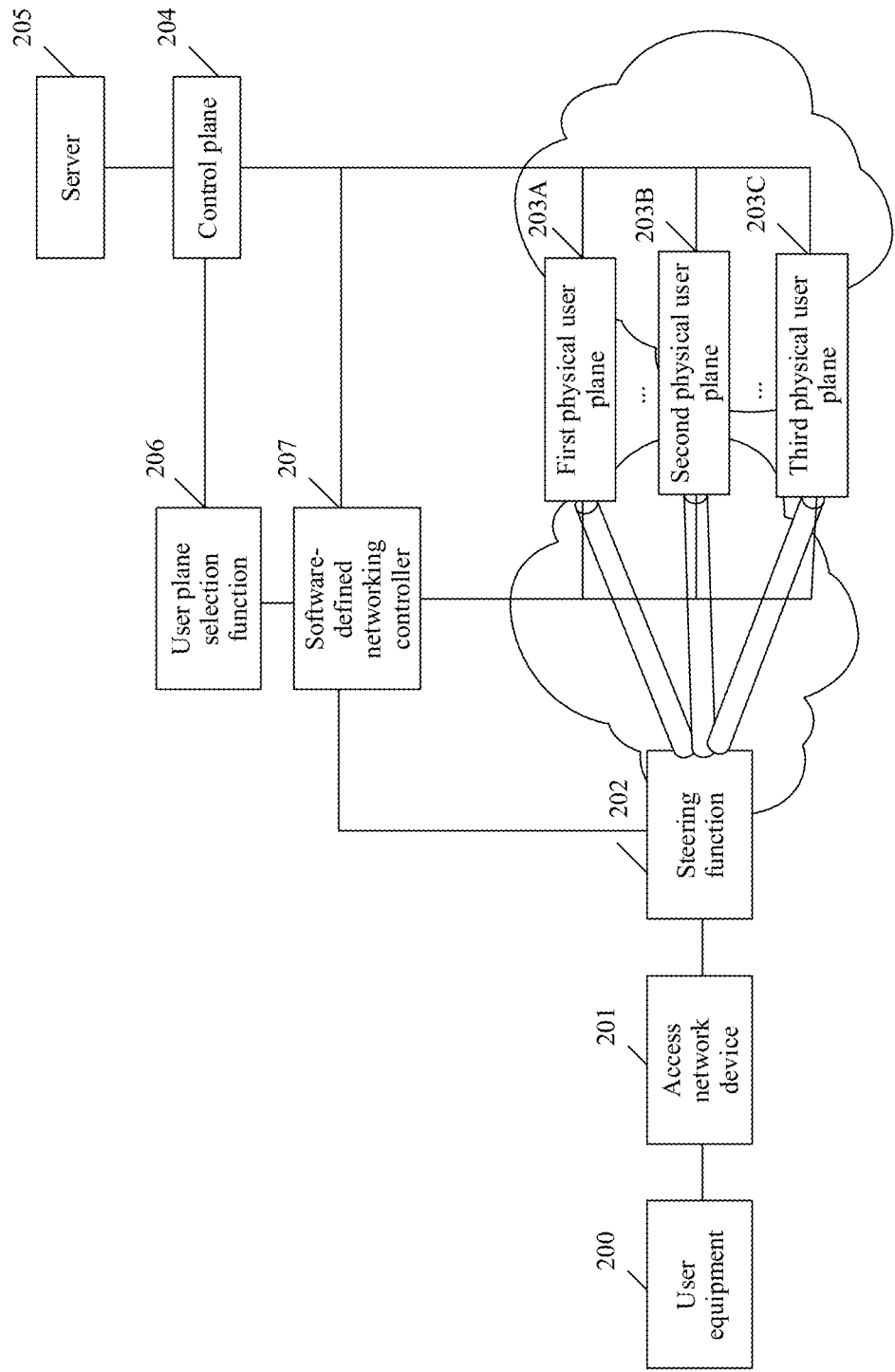
FIG. 2A is a schematic diagram of a network architecture according to an embodiment of this application.

FIG. 2A is a schematic diagram of a network architecture according to an embodiment of this application. It can be learned from FIG. 2A that the network architecture may include one or more of the following: user equipment 200, an access network (AN) device 201, an SF 202, a first physical user plane 203A (pUP), a second physical user plane 203B, a third physical user plane 203C, a control plane (vBNG-CP) 204, a server 205, a user selection function (UP Selection Function, USF) 206, and a SDN controller 207. It should be noted that user planes not only include the first physical user plane 203A (pUP), the second physical user plane 203B, and the third physical user plane 203C shown in FIG. 2A.

The user equipment 200 includes but is not limited to: a residential gateway (RG), a customer premise equipment (CPE), a personal computer (PC), a network telephone (e.g., Voice over Internet Protocol (VoIP)), a web television (e.g., IP television (IPTV), a set top box (STB), and an integrated access device (IAD).

It can be learned from FIG. 2A that the SF 202 device is deployed behind the access network device 201. A layer 2 tunnel may be established between the SF 202 device and a user plane. Physical interfaces accessed by the SF device 202 and the access network device AN 201 may be divided into different sub-interfaces, different sub-interfaces may match different VLANs or QinQ, and different sub-interfaces may correspond to different layer 2 tunnels. It may be understood that a VLAN interface is a sub-interface created on a physical interface.

The control plane CP may manage a plurality of forwarding planes, and may schedule users, traffic, and resources between the plurality of forwarding planes. The USF is a UP selection function, and may be used to determine a UP gateway used when a user goes online or a UP gateway for dynamic migration after the user is online.

The USF may be built in the CP, or may be built in the SDN controller, or may be an independent network element. In other words, the USF and the CP may be one device, or the USF and the SDN controller may be one device, or the USF may be an independent device. This is not limited in this embodiment of this application.

Figure 2B:
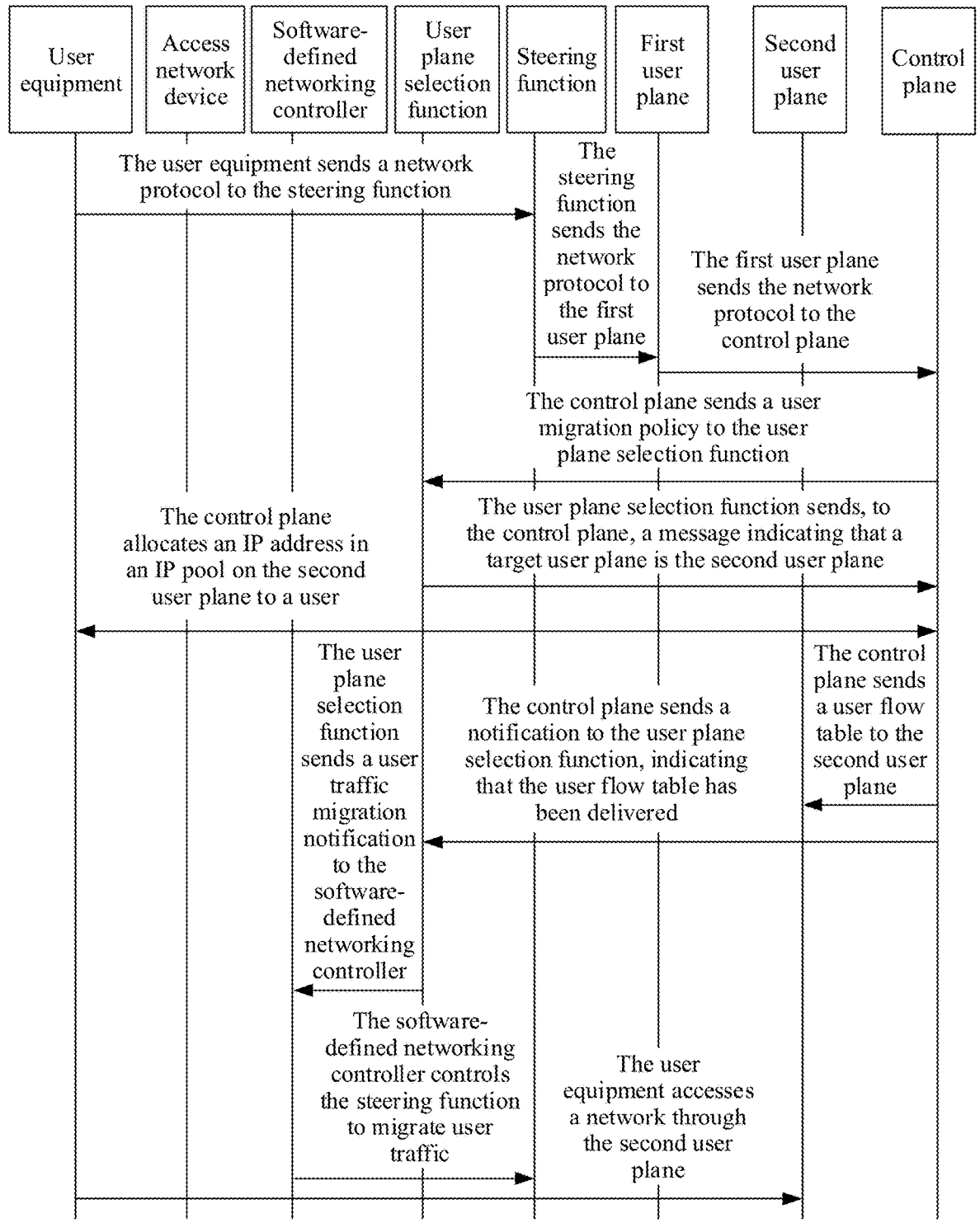
FIG. 2B is a schematic flowchart of user broadband access according to an embodiment of this application.

FIG. 2B is a schematic flowchart of user broadband access according to an embodiment of this application. It can be learned from FIG. 2B that a user completes dialing by using related control packet information such as a network protocol (which may be PPPoE or DHCP), to access a network. A specific procedure may be as follows.

User equipment sends related control packet information such as a network protocol to an SF, and then the SF sends the related control packet information such as the network protocol to a first user plane UP. Then, the first UP may send the related control packet information such as the network protocol to a control plane CP, and the CP sends a user migration policy on the first UP to a USF.

After receiving the user migration policy sent by the CP, the USF may determine, based on a user SLA, that the user needs to access a network through a second UP. Therefore, the USF sends, to the CP, a message indicating that a target UP for migration is the second UP. In other words, the USF indicates the CP to deliver a user entry to the second UP. After the CP allocates an IP address in an IP pool of the UP 2 to the user equipment, the CP delivers the user entry to the second UP. After the CP notifies the USF that the user entry has been delivered to the second UP, the USF indicates an SDN controller to configure the SF and bind a VLAN or a QinQ corresponding to the user to an interface corresponding to the second UP. In this case, user traffic is migrated from the first UP to the second UP, and a subsequent forwarding packet of the user equipment may be directly forwarded to the second UP.

The user entry is used by the second UP to enable the user to access the network based on the user entry when the first UP is faulty.

It should be noted that in this embodiment of this application, a vBNG-UP may be understood as a forwarding plane, or may be understood as a vBNG-UP or a user plane. A vBNG-CP may be understood as a control plane, or may be understood as a vBNG-CP.

When the user equipment goes offline due to a user plane fault, the user can access a new UP only after the user goes offline and re-dials up, to restore traffic. However, a procedure of completing broadband access through re-dialing is cumbersome, service interruption time is excessively long, and user experience is poor.

It should be noted that the user plane fault includes but is not limited to: a user plane interface fault, an interface board fault, a fault of an entire device of the user, or the like.

Figure 3:
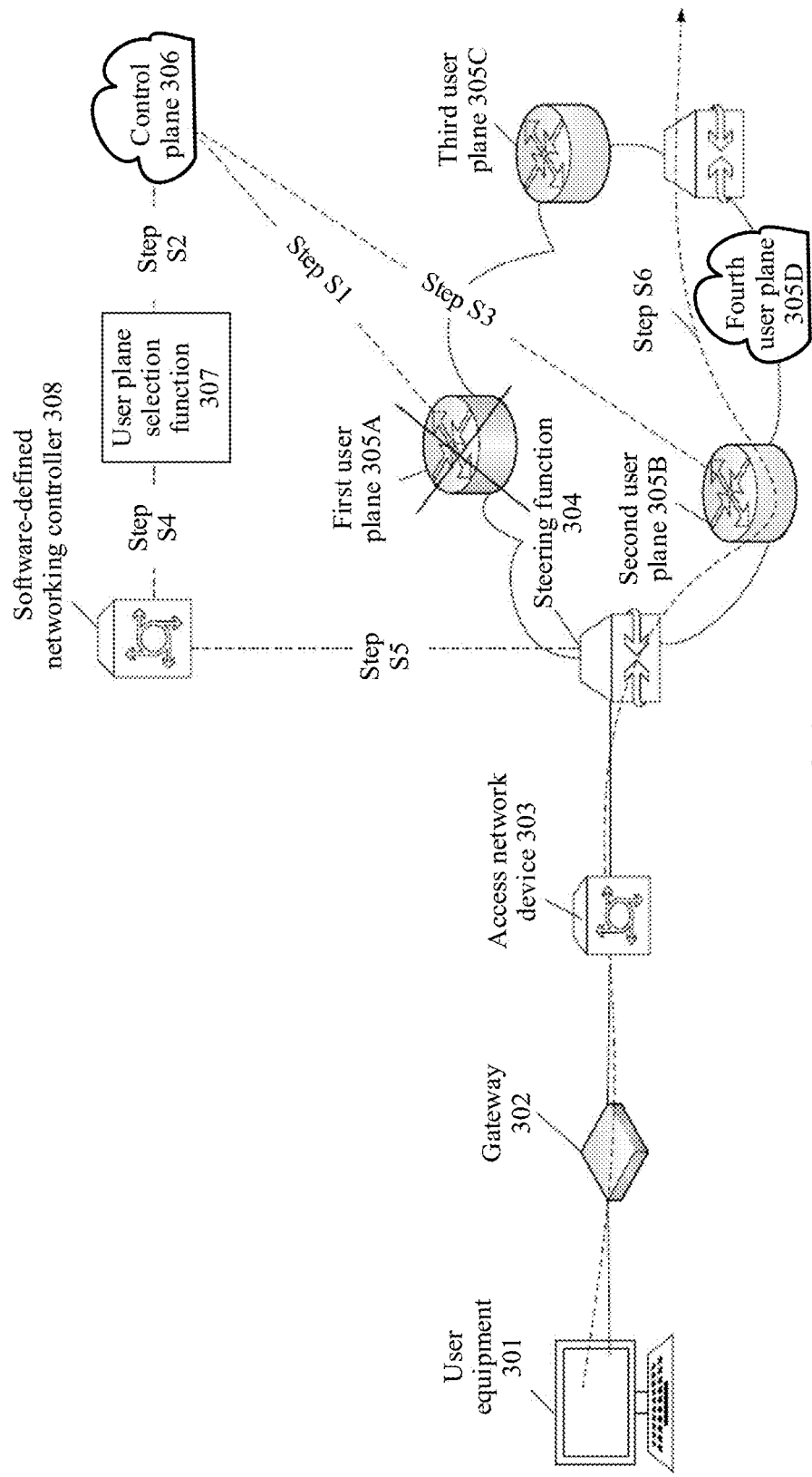
FIG. 3 is a schematic diagram of an architecture of a broadband connection according to an embodiment of this application.

FIG. 3 is a schematic diagram of an architecture of a broadband connection according to an embodiment of this application. It can be learned from FIG. 3 that when a user plane is faulty, user traffic is migrated from a faulty first user plane 305A to a second user plane 305B without being perceived by a user equipment side. A specific method includes at least the following steps.

Step S1: A control plane 306 monitors a status of a connection to the first user plane 305A in real time, and after the first user plane 305A is disconnected from the control plane due to a fault, the control plane may detect that the status of the connection to the first user plane is a disconnected state, and perceive that the first user plane 305A is faulty.

Step S2: The control plane 306 queries a USF 307 for a target user plane to which a user affected by the fault of the first user plane 305A needs to be migrated. The USF 307 may determine, based on requirements such as a load status of each user plane and an SLA of each user plane, the target user plane to which the user needs to be migrated when the first user plane 305A is faulty.

Step S3: After the control plane 306 receives a message that indicates that the target user plane is the second user plane 305B and that is sent by the USF 306, the control plane 306 delivers a user entry to the second user plane 305B. The user entry is information indicating that the user accesses a network through the second user plane 305B, and may further include one or more of the following information: related information of the control plane 306, a forwarding entry, dialing information of the user, media access control (MAC) information of the user, interface information of the second user plane 305B, and the like.

The user entry is used by the second user plane 305B to access the network based on the user entry when the first user plane 305A is faulty.

Step S4: The USF 307 indicates SDN 308 to migrate user traffic.

Step S5: The SDN 308 controls a SF 304 to steer traffic of user equipment from the first user plane 305A to the second user plane 305B.

Step S6: Steer the traffic of the user equipment to the second user plane 305B for forwarding.

It should be noted that in this embodiment of this application, the user plane may include a vUP or a pUP. This is not limited in this embodiment of this application. For example, the first user plane may be a first physical user plane, or may be a first virtual user plane.

In addition, the user plane mentioned in this embodiment of this application may be a broadband network gateway user plane, and the control plane mentioned in this embodiment of this application may be a broadband network gateway control plane.

Figure 4:
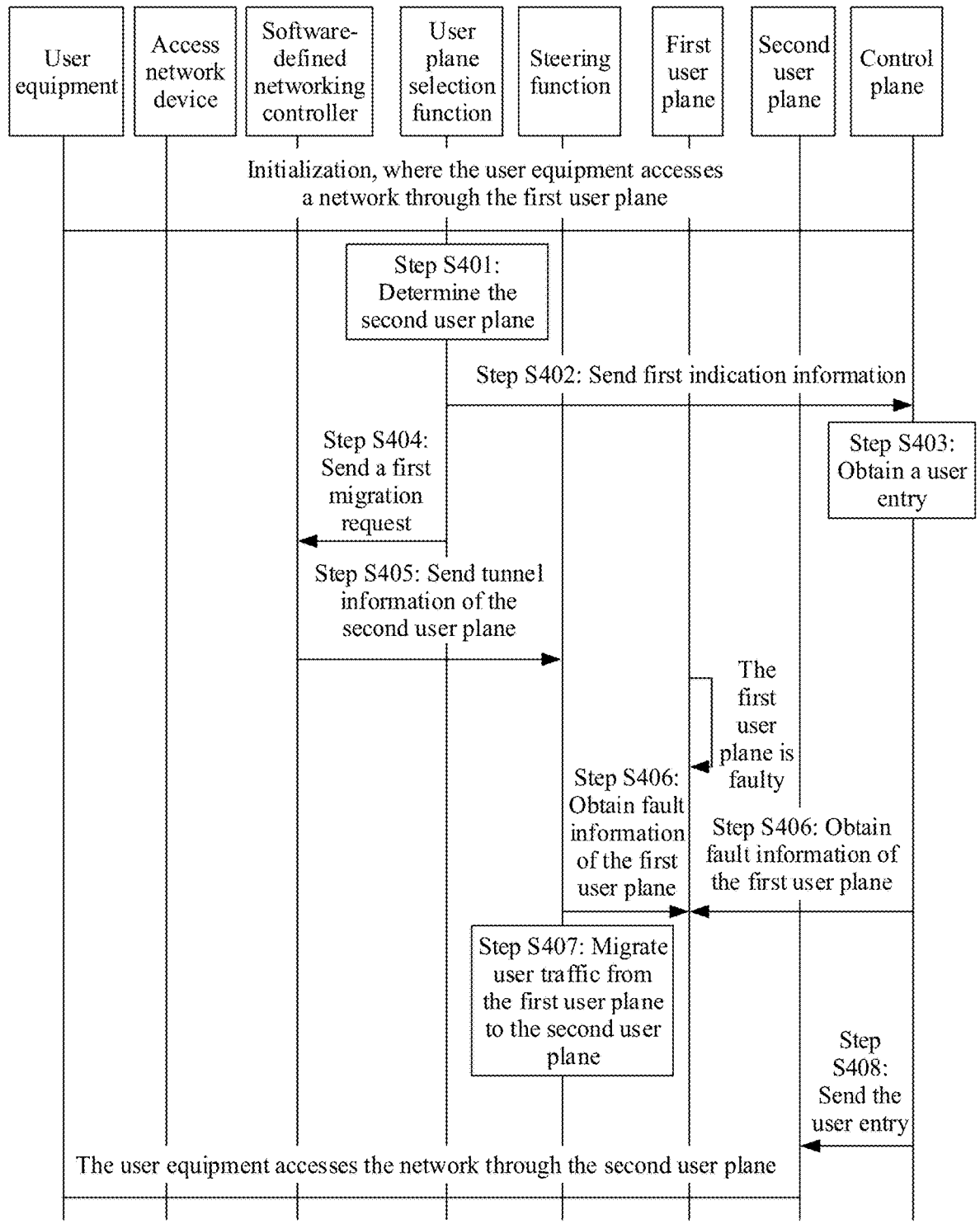
FIG. 4 is a schematic flowchart of another broadband connection according to an embodiment of this application.

FIG. 4 is a schematic flowchart of another broadband connection according to an embodiment of this application. Further, a method may be implemented based on the framework shown in FIG. 2A. The method includes at least the following steps.

After accessing a network through a third user plane according to the schematic flowchart shown in FIG. 2B, user equipment may migrate user traffic from the third user plane to a first user plane when a USF determines, based on an SLA, that the user equipment needs to access the network through the first user plane. Therefore, a subsequent forwarding packet of the user equipment may be directly forwarded to the first user plane.

Step S401: The USF determines a second user plane.

Further, the USF may determine, based on requirements such as a load status of each user plane and an SLA of each user plane, a target vBNG-UP to which the user traffic needs to be migrated when a first vBNG-UP is faulty. Therefore, when requirements such as load balancing and the SLA are met, and network utilization is improved, the USF may determine, from a plurality of vBNG-UPs, that the target vBNG-UP is a second vBNG-UP.

Step S402: The USF sends first indication information to a control plane.

Further, when the USF determines that the target vBNG-UP is the second vBNG-UP, the USF may send the first indication information to a vBNG-CP, where the first indication information indicates information indicating that the target vBNG-UP that replaces the first vBNG-UP when the first vBNG-UP is faulty is the second vBNG-UP.

Step S403: The control plane obtains a user entry.

Further, after the vBNG-CP receives the first indication information from the USF, the vBNG-CP may generate a user entry of the second vBNG-UP in real time.

The user entry is information indicating that the second vBNG-UP enables a user to access a network through the second vBNG-UP based on the user entry when the first vBNG-UP is faulty, and may include one or more of the following information: related information of the control plane 306, a forwarding entry, dialing information of the user, MAC information of the user, interface information of the second vBNG-UP, and the like. The user entry is used by the second vBNG-UP to maintain a broadband connection of the user when the first vBNG-UP is faulty.

Step S404: The USF sends a first migration request to an SDN controller.

Further, when the USF determines that the target vBNG-UP is the second vBNG-UP, the USF sends, to the SDN controller, information for requesting to migrate the user traffic from the first vBNG-UP to the second vBNG-UP when the vBNG-UP is faulty.

Step S405: The SDN controller sends path information of the second user plane to an SF.

Further, after the SDN controller receives the first migration request from the USF, the SDN controller learns that the target vBNG-UP is the second vBNG-UP, and the SDN controller sends the path information of the second vBNG-UP to the SF. In this way, when the first vBNG-UP is faulty, the SF can quickly steer traffic of an affected user to the second vBNG-UP.

Step S406: Obtain fault information of the first user plane.

Further, the SF and the vBNG-CP may detect a status of a connection to the first vBNG-UP in real time. After the first vBNG-UP is disconnected from the vBNG-CP or the SF due to a fault, the SF and the vBNG-CP may detect that the status of the connection to the first vBNG-UP is a disconnected state, and the SF and the vBNG-CP may obtain the fault information about the disconnection from the first vBNG-UP.

Optionally, after the SF obtains the fault information about the disconnection from the first vBNG-UP, the SF may send the fault information of the first user plane to the vBNG-CP, so that the vBNG-CP learns that the first vBNG-UP is faulty.

Optionally, after the vBNG-CP obtains the fault information about the disconnection from the first vBNG-UP, the vBNG-CP may send the fault information of the first user plane to the SF, so that the SF learns that the first vBNG-UP is faulty. The fault case of the first vBNG-UP may be an interface fault, a connector board fault, an entire device fault, or the like of the first vBNG-UP.

Step S407: The SF migrates the user traffic from the first user plane to the second user plane.

Further, when the SF obtains the fault information of the first vBNG-UP, a VLAN or a QinQ corresponding to the user may be bound to an interface corresponding to the second vBNG-UP based on the path information of the second user plane sent by the SDN controller, to complete migration of the user traffic from the first vBNG-UP to the second vBNG-UP.

Step S408: The control plane sends the user entry to the second user plane.

Further, when obtaining the fault information of the first vBNG-UP, the vBNG-CP may send the user plane entry generated in advance to the second vBNG-UP.

In this case, the user traffic is steered from the first vBNG-UP to the second vBNG-UP, and subsequent traffic is also forwarded from the second vBNG-UP.

When the USF plans, in advance, that the target vBNG-UP that replaces the first vBNG-UP is the second vBNG-UP when the first vBNG-UP is faulty, and the SF and the vBNG-CP perceive that the first vBNG-UP is faulty, the SF may quickly migrate user traffic from the first vBNG-UP to the second vBNG-UP, and the vBNG-CP may quickly send the user entry to the second vBNG-UP. In this case, when the first vBNG-UP is faulty, the user traffic may be quickly steered to the second vBNG-UP, to access the network through the second vBNG-UP.

Figure 5:
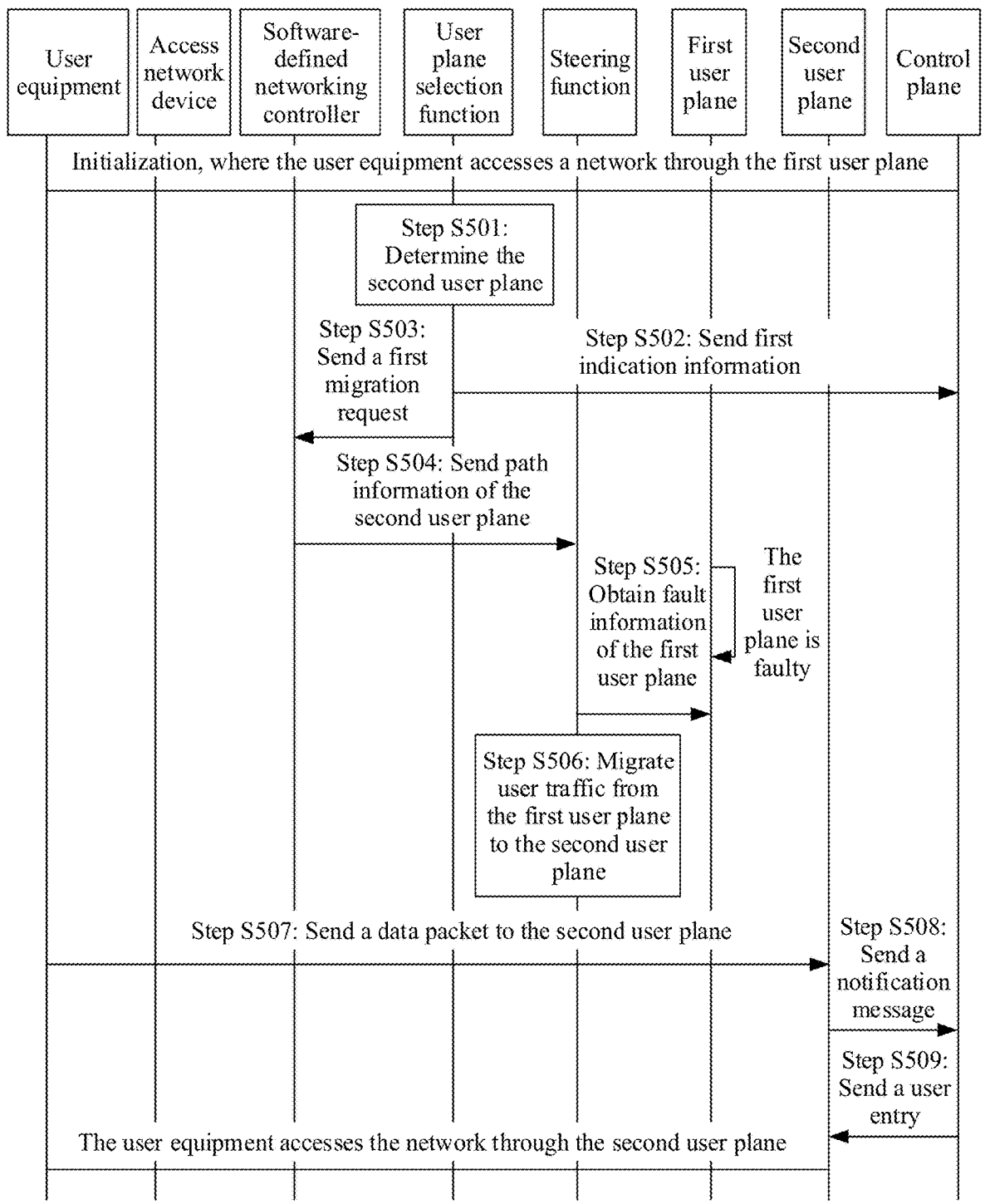
FIG. 5 is a schematic flowchart of another broadband connection according to an embodiment of this application.

FIG. 5 is a schematic flowchart of another broadband connection according to an embodiment of this application. Further, the method may be implemented based on the framework shown in FIG. 2A. The method includes at least the following steps.

After accessing a network through a third user plane according to the schematic flowchart shown in FIG. 2B, user equipment may migrate user traffic from the third user plane to a first user plane when a USF determines, based on an SLA, that the user equipment needs to access the network through the first user plane. Therefore, a subsequent forwarding packet of the user equipment may be directly forwarded to the first user plane.

Step S501: The USF determines a second user plane.

Further, for detailed descriptions, refer to step S401. Details are not described herein again.

Step S502: The USF sends first indication information to a control plane.

Further, for detailed descriptions, refer to step S402. Details are not described herein again.

Step S503: The USF sends a first migration request to an SDN controller.

Further, for detailed descriptions, refer to step S404. Details are not described herein again.

Step S504: The SDN controller sends path information of the second user plane to an SF.

Further, the SDN may receive the first migration request sent by the USF. For detailed descriptions, refer to step S405. Details are not described herein again.

Step S505: The SF obtains fault information of the first user plane.

Further, the SF may detect a status of a connection to a first vBNG-UP in real time. After the first vBNG-UP is disconnected from a vBNG-CP due to a fault, the SF may detect that the status of the connection to the first vBNG-UP is a disconnected state, and the SF may obtain the fault information about the disconnection from the first vBNG-UP.

The fault may be an interface fault, a connector board fault, an entire device fault, or the like of the first vBNG-UP.

Step S506: The SF migrates user traffic from the first user plane to the second user plane.

Further, for detailed descriptions, refer to step S407. Details are not described herein again.

Step S507: The user equipment sends a data packet to the second user plane.

Further, after the SF migrates the user traffic from the first user plane to the second user plane, the user equipment may send the data packet to the second user plane.

Step S508: The second user plane sends a notification message to the control plane.

Further, when the vBNG-CP learns, after receiving the first indication information from the USF, that a target vBNG-UP is a second vBNG-UP, after traffic of the first vBNG-UP is migrated to the second vBNG-UP, the second vBNG-UP may send, to the vBNG-CP, a message indicating the vBNG-CP to send a user entry to the second vBNG-UP.

Step S509: The control plane sends the user entry to the second user plane.

Further, when receiving the notification message that is sent by the second vBNG-UP after the user traffic is migrated from the first vBNG-UP to the second vBNG-UP, the vBNG-CP may send the user plane entry to the second vBNG-UP.

In this case, the user traffic is steered from the first vBNG-UP to the second vBNG-UP, and subsequent traffic is also forwarded from the second vBNG-UP.

When the USF plans, in advance, that the target vBNG-UP that replaces the first vBNG-UP is the second vBNG-UP when the first vBNG-UP is faulty, and the SF perceives that the first vBNG-UP is faulty, the SF may quickly migrate the user traffic from the first vBNG-UP to the second vBNG-UP. When the user traffic of the first vBNG-UP is migrated to the second vBNG-UP, the vBNG-CP may send the user entry to the second vBNG-UP. In this case, when the first vBNG-UP is faulty, the user traffic may be quickly steered to the second vBNG-UP, to access the network through the second vBNG-UP.

Figure 6:
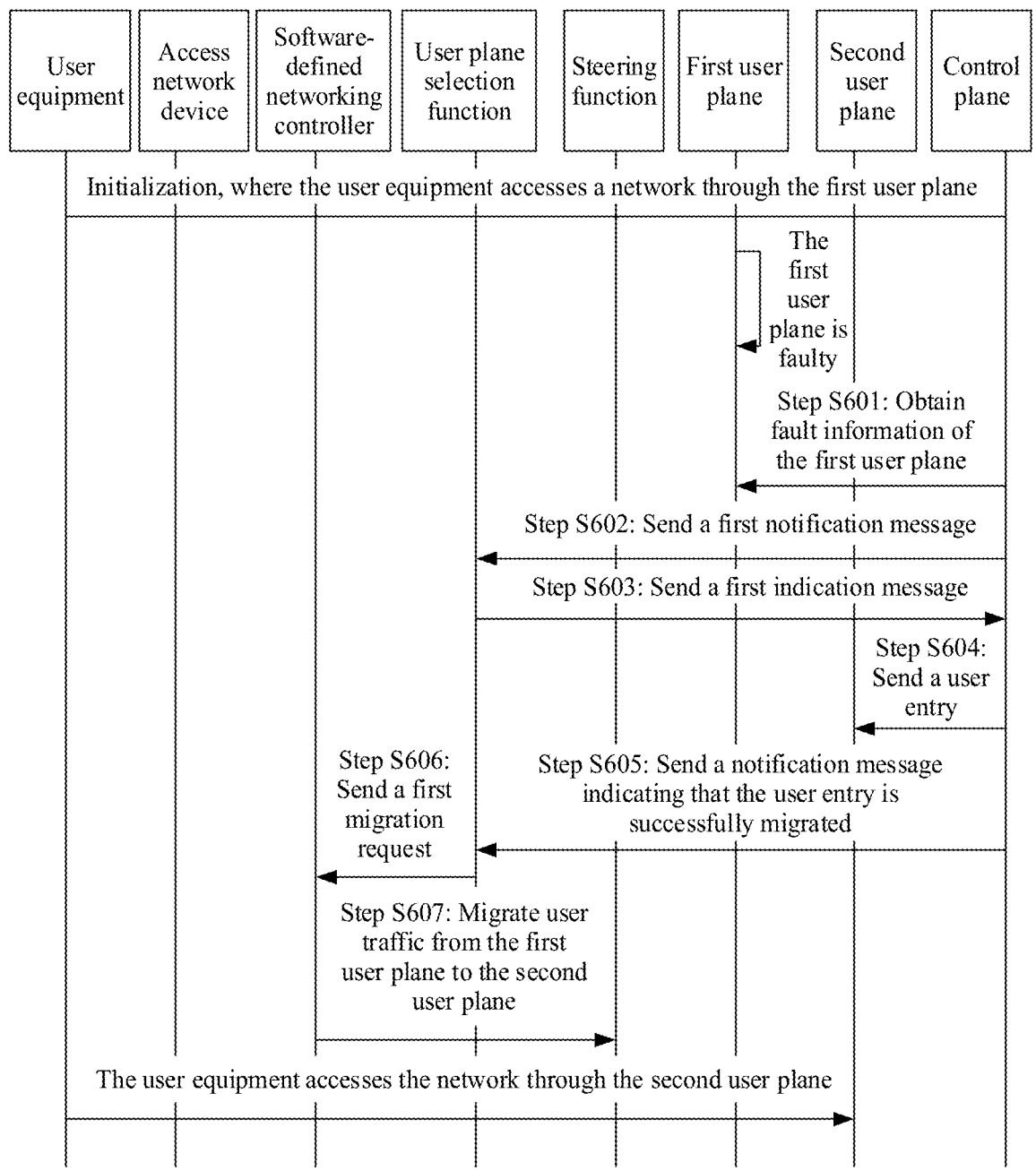
FIG. 6 is a schematic flowchart of another broadband connection according to an embodiment of this application.

FIG. 6 is a schematic flowchart of a broadband connection according to an embodiment of this application. Further, the method may be implemented based on the framework shown in FIG. 2A. The method includes at least the following steps.

After accessing a network through a third user plane according to the schematic flowchart shown in FIG. 2B, user equipment may migrate user traffic from the third user plane to a first user plane when a USF determines, based on an SLA, that the user equipment needs to access the network through the first user plane. Therefore, a subsequent forwarding packet of the user equipment may be directly forwarded to the first user plane.

When the user equipment is disconnected from the network and cannot be connected to the network because of an interface fault, a connector board fault, or an entire device fault on the first user plane, a broadband connection of the user equipment may be maintained uninterrupted according to the following steps.

Step S601: A control plane obtains fault information of the first user plane.

Further, a vBNG-CP may detect a status of a connection to a first vBNG-UP in real time. After the first vBNG-UP is disconnected from the vBNG-CP due to a fault, the vBNG-CP may detect that the status of the connection to the first vBNG-UP is a disconnected state, and the vBNG-CP may obtain the fault information about the disconnection from the first vBNG-UP.

Step S602: The control plane sends a first notification message to a USF.

Further, when the vBNG-CP detects the disconnection from the first vBNG-UP, the vBNG-CP may send, to the USF, the notification message used to notify that the first vBNG-UP is faulty.

Step S603: The USF sends first indication information to the control plane.

Further, after the USF receives the notification message about the fault of the first vBNG-UP from the vBNG-CP, the USF may determine, based on requirements such as a load status of each user plane and an SLA of each user plane, a target vBNG-UP that replaces the first vBNG-UP. For example, if the user equipment requires a higher-level SLA service, a user plane that meets the requirement may be determined for the user equipment based on an SLA level of each user plane. Therefore, when requirements such as load balancing and the SLA are met, and network utilization is improved, the USF may determine, from a plurality of vBNG-UPs, that the target vBNG-UP is a second vBNG-UP. Therefore, the USF may send, to the vBNG-CP, indication information indicating that the target user plane that replaces the faulty first vBNG-UP is the second vBNG-UP.

Step S604: The control plane sends a user entry to the second user plane.

Further, after the vBNG-CP receives the first indication information from the USF, the vBNG-CP may learn that the target user plane that replaces the first vBNG-UP is the second vBNG-UP, and the vBNG-CP may send the user entry to the second vBNG-UP based on the first indication information.

Step S605: The control plane sends, to the USF, a notification message indicating that the user entry is successfully migrated.

Further, after the vBNG-CP sends the user entry to the second vBNG-UP, the vBNG-CP sends, to the USF, a second notification message indicating that the user entry is successfully migrated, where the second notification message indicates that the vBNG-CP has sent the user entry to the second vBNG-UP, and the notification message is used by the USF to trigger an SDN controller to migrate user traffic from the first vBNG-UP to the second vBNG-UP.

Step S606: The USF sends a first migration request to the SDN controller.

Further, after the USF receives, from the vBNG-CP, the second notification message indicating that the user entry is successfully migrated, the USF sends, to the SDN controller, information for requesting to migrate the user traffic from the first vBNG-UP to the second vBNG-UP.

Step S607: The SDN controller controls a SF to migrate the user traffic from the first user plane to the second user plane.

Further, after the SDN controller receives the first migration request from the USF, the SDN controller controls the SF to bind a VLAN or a QinQ corresponding to a user to an interface corresponding to the second vBNG-UP. In this way, the user traffic may be migrated from the first vBNG-UP to the second vBNG-UP.

Therefore, when the vBNG-CP perceives that the first vBNG-UP is faulty, a user plane device may access the network through the second user plane, to forward a data packet.

Figure 7:
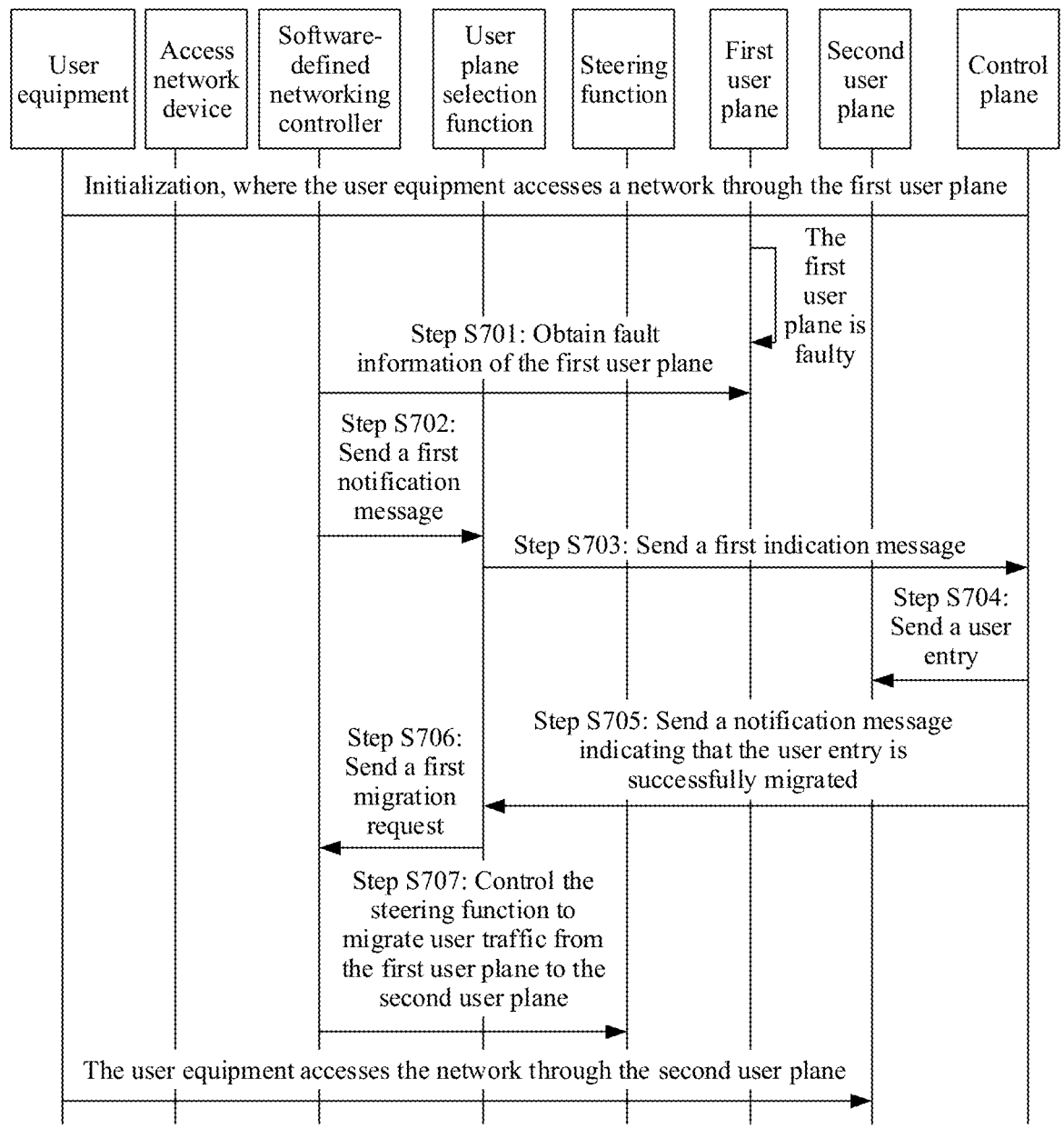
FIG. 7 is a schematic flowchart of another broadband connection according to an embodiment of this application.

FIG. 7 is a schematic flowchart of another broadband connection according to an embodiment of this application. Further, the method may be implemented based on the framework shown in FIG. 2A. The method includes at least the following steps.

After accessing a network through a third user plane according to the schematic flowchart shown in FIG. 2B, user equipment may migrate user traffic from the third user plane to a first user plane when a USF determines, based on an SLA, that the user equipment needs to access the network through the first user plane. Therefore, a subsequent forwarding packet of the user equipment may be directly forwarded to the first user plane.

When the user equipment is disconnected from the network and cannot be connected to the network because of an interface fault, a connector board fault, or an entire device fault on the first user plane, a broadband connection of the user equipment may be maintained uninterrupted according to the following steps.

Step S701: An SDN controller obtains fault information of the first user plane.

Further, the SDN controller may detect a status of a connection to a first vBNG-UP in real time. After the first vBNG-UP is disconnected from the SDN controller due to a fault, the SDN controller may detect that the status of the connection to the first vBNG-UP is a disconnected state, and the SDN controller may obtain the fault information about the disconnection from the first vBNG-UP.

Step S702: The SDN controller sends a first notification message to a USF.

Further, when the SDN controller detects the disconnection from the first vBNG-UP, the SDN controller may send, to the USF, the notification message used to notify that the first vBNG-UP is faulty.

Step S703: The USF sends first indication information to a control plane.

Further, after the USF receives, from the SDN controller, the notification message about the fault of the first vBNG-UP, for detailed descriptions, refer to step S603. Details are not described herein again.

Step S704: The control plane sends a user entry to a second user plane.

Further, for detailed descriptions, refer to step S604. Details are not described herein again.

Step S705: The control plane sends, to the USF, a notification message indicating that the user entry is successfully migrated.

Further, for detailed descriptions, refer to step S605. Details are not described herein again.

Step S706: The USF sends a first migration request to the SDN controller.

Further, for detailed descriptions, refer to step S606. Details are not described herein again.

Step S707: The SDN controller controls a SF to migrate user traffic from the first user plane to the second user plane.

Further, for detailed descriptions, refer to step S607. Details are not described herein again.

Therefore, when the SDN controller perceives that the first vBNG-UP is faulty, a user plane device may access a network through the second user plane, to forward a data packet.

Figure 8:
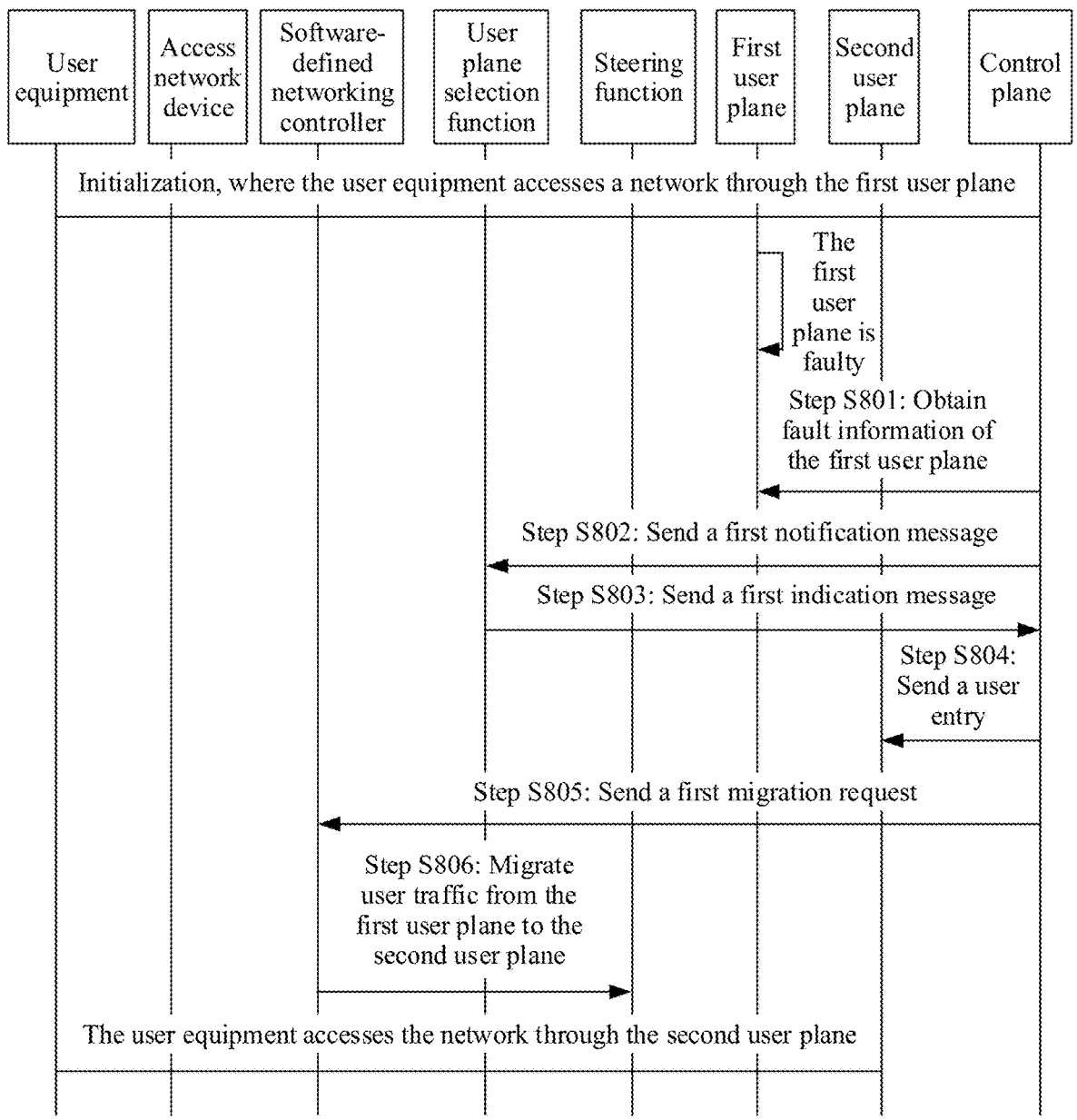
FIG. 8 is a schematic flowchart of another broadband connection according to an embodiment of this application.

FIG. 8 is a schematic flowchart of a broadband connection according to an embodiment of this application. Further, the method may be implemented based on the framework shown in FIG. 2A. The method includes at least the following steps.

After accessing a network through a third user plane according to the schematic flowchart shown in FIG. 2B, user equipment may migrate user traffic from the third user plane to a first user plane when a USF determines, based on an SLA, that the user equipment needs to access the network through the first user plane. Therefore, a subsequent forwarding packet of the user equipment may be directly forwarded to the first user plane.

When the user equipment is disconnected from the network and cannot be connected to the network because of an interface fault, a connector board fault, or an entire device fault on the first user plane, a broadband connection of the user equipment may be maintained uninterrupted according to the following steps.

Step S801: A control plane obtains fault information of the first user plane.

Further, for detailed descriptions, refer to step 601. Details are not described herein again.

Step S802: The control plane sends a first notification message to a USF.

Further, for detailed descriptions, refer to step 602. Details are not described herein again.

Step S803: The USF sends first indication information to the control plane.

Further, for detailed descriptions, refer to step 603. Details are not described herein again.

Step S804: The control plane sends a user entry to a second user plane.

Further, for detailed descriptions, refer to step 604. Details are not described herein again.

Step S805: The control plane sends a first migration request to the SDN controller.

Further, after a vBNG-CP sends the user entry to a second vBNG-UP, the vBNG-CP sends, to the SDN controller, information for requesting to migrate user traffic from a first vBNG-UP to the second vBNG-UP.

Step S806: The SDN controller controls an SF to migrate the user traffic from the first user plane to the second user plane.

Further, after the SDN controller receives the first migration request from the vBNG-CP, the SDN controller controls the SF to bind a VLAN or a QinQ corresponding to a user to an interface corresponding to the second vBNG-UP. In this way, the user traffic may be migrated from the first vBNG-UP to the second vBNG-UP.

Therefore, when the vBNG-CP perceives that the first vBNG-UP is faulty, a user plane device may access the network through the second user plane, to forward a data packet.

Figure 9:
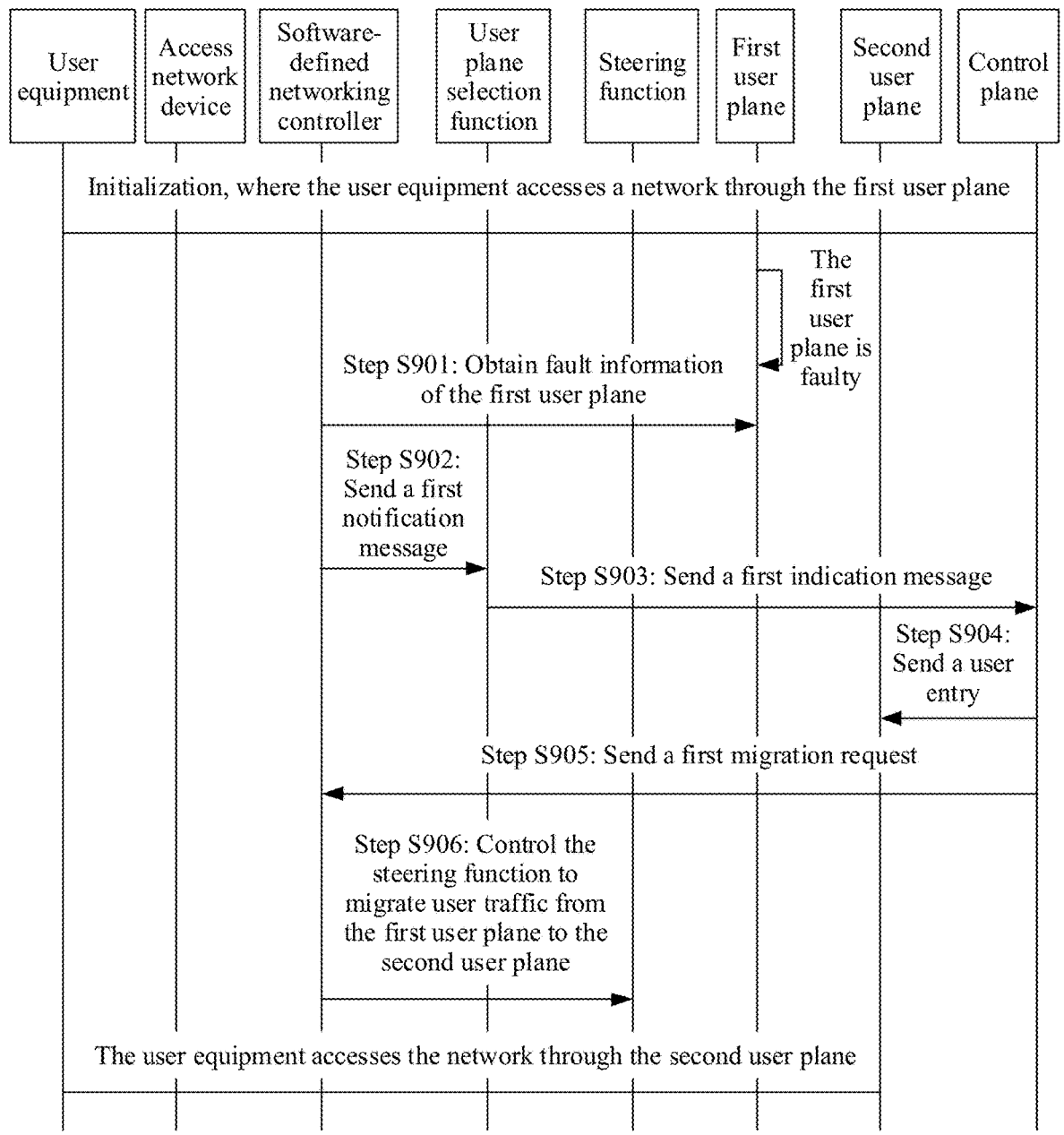
FIG. 9 is a schematic flowchart of another broadband connection according to an embodiment of this application.

FIG. 9 is a schematic flowchart of another broadband connection according to an embodiment of this application. Further, the method may be implemented based on the framework shown in FIG. 2A. The method includes at least the following steps.

After accessing a network through a third user plane according to the schematic flowchart shown in FIG. 2B, user equipment may migrate user traffic from the third user plane to a first user plane when a USF determines, based on an SLA, that the user equipment needs to access the network through the first user plane. Therefore, a subsequent forwarding packet of the user equipment may be directly forwarded to the first user plane.

When the user equipment is disconnected from the network and cannot be connected to the network because of an interface fault, a connector board fault, or an entire device fault on the first user plane, a broadband connection of the user equipment may be maintained uninterrupted according to the following steps.

Step S901: An SDN controller obtains fault information of the first user plane.

Further, for detailed descriptions, refer to step 701. Details are not described herein again.

Step S902: The SDN controller sends a first notification message to a USF.

Further, for detailed descriptions, refer to step 702. Details are not described herein again.

Step S903: The USF sends first indication information to a control plane.

Further, for detailed descriptions, refer to step S603. Details are not described herein again.

Step S904: The control plane sends a user entry to a second user plane.

Further, for detailed descriptions, refer to step S604. Details are not described herein again.

Step S905: The control plane sends a first migration request to the SDN controller.

Further, for detailed descriptions, refer to step S805. Details are not described herein again.

Step S906: The SDN controller controls an SF to migrate user traffic from the first user plane to a second user plane.

Further, for detailed descriptions, refer to step S806. Details are not described herein again.

Therefore, when the SDN controller perceives that a first vBNG-UP is faulty, a user plane device may access a network through the second user plane, to forward a data packet.

It should be noted that, the USF may be built in the CP, or may be built in the SDN controller, or may be an independent network element. In other words, the USF and the CP may be one device, or the USF and the SDN controller may be one device, or the USF may be an independent device. This is not limited in this embodiment of this application.

When the USF is built in the CP, that the USF determines a second vBNG-UP may be considered as that the CP determines the second vBNG-UP.

When the USF is built in the SDN controller, that the USF determines a second vBNG-UP may be considered as that the SDN controller determines the second vBNG-UP.

The methods in embodiments of this application are described above in detail, and apparatuses in embodiments of this application are provided below.

Figure 10:
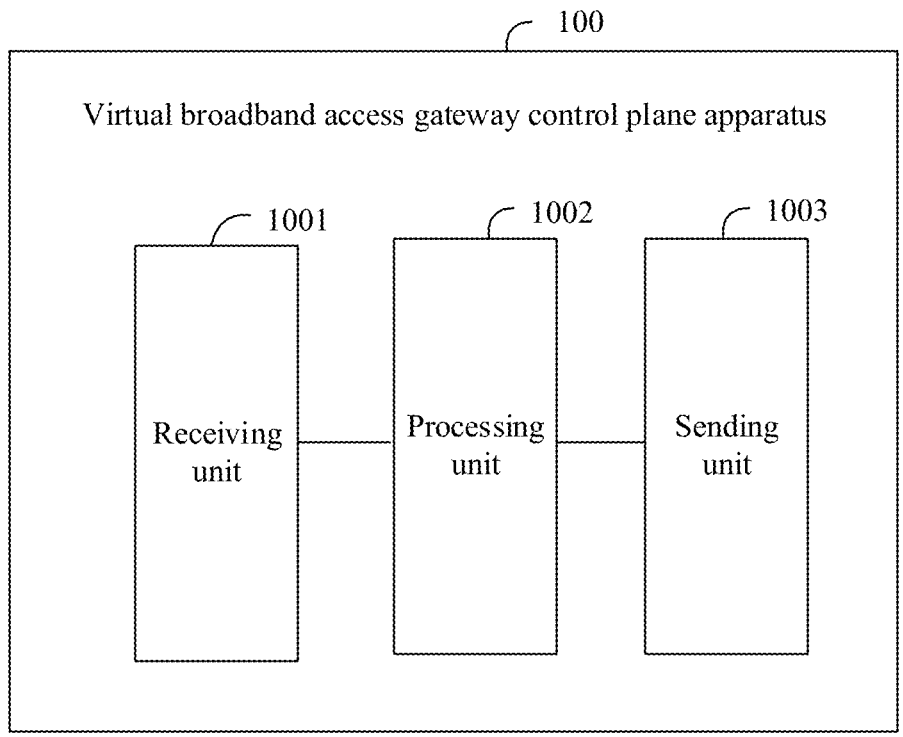
FIG. 10 is a schematic diagram of a structure of a vBNG-CP apparatus according to an embodiment of this application.

FIG. 10 is a schematic diagram of a structure of a vBNG-CP apparatus 100 according to an embodiment of this application. The apparatus 100 may be a node, or may be a component in the node, for example, a chip or an integrated circuit. The apparatus 100 may include a receiving unit 1001 and a processing unit 1002. The vBNG-CP apparatus 100 is configured to implement the foregoing method for maintaining a broadband connection uninterrupted, for example, the method for maintaining a broadband connection uninterrupted according to any embodiment shown in FIG. 4 to FIG. 9. It should be understood that, in the apparatus embodiments of this application, division into a plurality of units or modules is merely logical division based on functions, and is not intended to limit a specific structure of the apparatus. In a specific implementation, some functional modules may be further divided into more fine functional modules, and some functional modules may be combined into one functional module. However, regardless of whether the functional modules are further divided or combined, general procedures performed by the apparatus 100 in a process of maintaining a broadband connection uninterrupted are the same. For example, the receiving unit 1001 and the processing unit 1002 of the apparatus 100 may alternatively be combined into a communication unit. Usually, each unit corresponds to respective program code (or program instructions). When the program code corresponding to the unit is run on a processor, the unit executes a corresponding procedure to implement a corresponding function.

In a specific implementation, the vBNG-CP apparatus 100 may be the vBNG-CP in the embodiments shown in FIG. 4 to FIG. 10. The units are described as follows.

The receiving unit 1001 may be configured to receive first indication information from a USF, where the first indication information indicates a second vBNG-UP that replaces a first vBNG-UP when the first vBNG-UP is faulty. For a specific implementation, refer to detailed descriptions of step S403 in the embodiment shown in FIG. 4, step S508 in the embodiment shown in FIG. 5, and step S603 in the embodiment shown in FIG. 6. Details are not described herein again.

The processing unit 1002 may be configured to send a user entry to the second vBNG-UP based on the first indication information, where the user entry is used by the second vBNG-UP to enable a user to access a network based on the user entry when the first vBNG-UP is faulty. For a specific implementation, refer to detailed descriptions of step S408 in the embodiment shown in FIG. 4 and step S509 in the embodiment shown in FIG. 5. Details are not described herein again.

It can be learned that the vBNG-CP may obtain, in advance, a target user plane (the second vBNG-UP) to which the user affected by a fault of a first user plane needs to be migrated. Therefore, the vBNG-CP may send the user entry to the second vBNG-UP in advance. In this way, when the first user plane is faulty, time for sending the user entry to the second vBNG-UP can be reduced, and a speed of steering user traffic from the first vBNG-UP to the second vBNG-UP can be improved.

In another specific implementation, before the receiving unit 1001 is configured to receive the first indication information from the USF, the receiving unit 1001 may be further configured to obtain fault information of the first vBNG-UP. For a specific implementation, refer to detailed descriptions of step S601 in the embodiment shown in FIG. 6 and step S801 in the embodiment shown in FIG. 8. Details are not described herein again. The apparatus 100 may further include a sending unit 1003 configured to send first notification information to a USF, where the first notification information is used to notify that the first vBNG-UP is faulty. For a specific implementation, refer to detailed descriptions of step S602 in the embodiment shown in FIG. 6 and step S802 in the embodiment shown in FIG. 8. Details are not described herein again.

In still another specific implementation, after the receiving unit 1001 is configured to receive the first indication information from the USF, and after the processing unit 1002 is configured to send the user entry to the second vBNG-UP based on the first indication information, the receiving unit 1001, may be further configured to obtain fault information of the first vBNG-UP. For a specific implementation, refer to detailed descriptions of step S406 in the embodiment shown in FIG. 4. Details are not described herein again.

In still another specific implementation, after the receiving unit 1001 is configured to receive the first indication information from the USF, and before the processing unit 1002 is configured to send the user entry to the second vBNG-UP based on the first indication information, the receiving unit 1001 is further configured to receive a notification message sent by the second vBNG-UP after user traffic is migrated from the first vBNG-UP to the second vBNG-UP, where the notification message indicates the vBNG-CP to send the user entry to the second vBNG-UP. For a specific implementation, refer to step S508 in the embodiment shown in FIG. 5. Details are not described herein again.

In still another specific implementation, after the processing unit 1002 is configured to send the user entry to the second vBNG-UP based on the first indication information, the apparatus 100 further includes the sending unit 1003, further configured to send a first migration request to an SDN controller, where the first migration request is used to request to migrate user traffic from the first vBNG-UP to the second vBNG-UP. For a specific implementation, refer to detailed descriptions of step S805 in the embodiment shown in FIG. 8 and step S905 in the embodiment shown in FIG. 9. Details are not described herein again.

In still another specific implementation, after the processing unit 1002 is configured to send the user entry to the second vBNG-UP based on the first indication information, the apparatus 100 further includes the sending unit 1003, further configured to send, to the USF, a notification message indicating that the user entry is successfully migrated, where the notification message is used by the USF to trigger an SDN controller to migrate user traffic from the first vBNG-UP to the second vBNG-UP. For a specific implementation, refer to detailed descriptions of step S605 in the embodiment shown in FIG. 6 and step S705 in the embodiment shown in FIG. 7. Details are not described herein again.

It should be noted that, for implementations and beneficial effects of the units, refer to corresponding descriptions in the method embodiments shown in FIG. 4 to FIG. 10.

Figure 11:
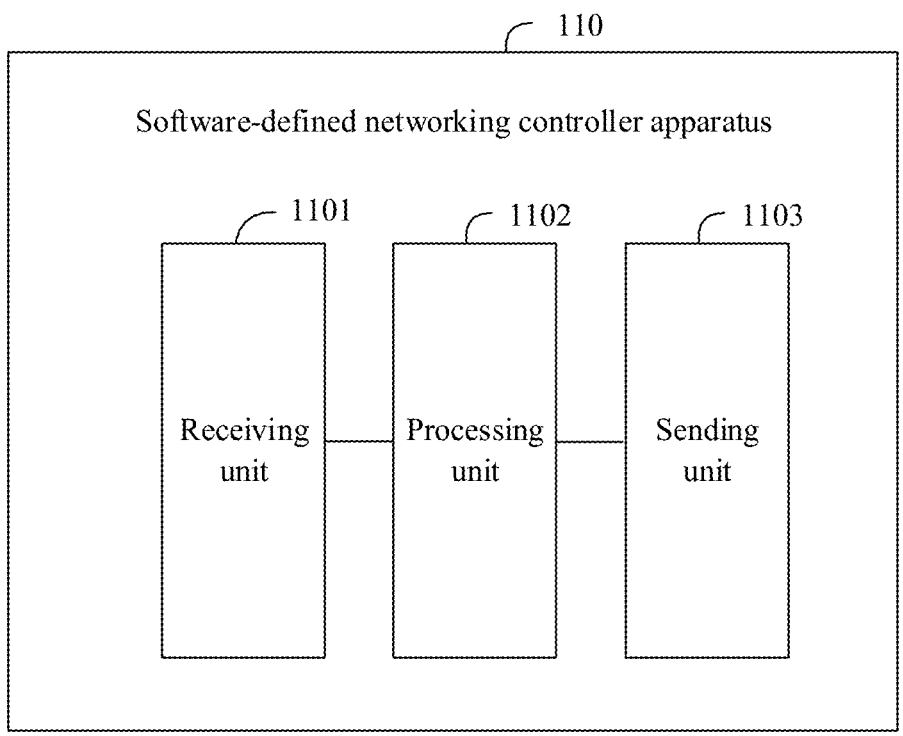
FIG. 11 is a schematic diagram of a structure of an SDN controller apparatus according to an embodiment of this application.

FIG. 11 is a schematic diagram of a structure of an SDN controller apparatus 110 according to an embodiment of this application. The apparatus 110 may be a node, or may be a component in the node, for example, a chip or an integrated circuit. The apparatus 110 may include a receiving unit 1101 and a processing unit 1102. The apparatus 110 for maintaining a broadband connection uninterrupted is configured to implement the foregoing method for maintaining a broadband connection uninterrupted, for example, the method for maintaining a broadband connection uninterrupted according to any embodiment shown in FIG. 4 to FIG. 10.

It should be understood that, in the apparatus embodiments of this application, division into a plurality of units or modules is merely logical division based on functions, and is not intended to limit a specific structure of the apparatus. In a specific implementation, some functional modules may be further divided into more fine functional modules, and some functional modules may be combined into one functional module. However, regardless of whether the functional modules are further divided or combined, general procedures performed by the apparatus 110 in a process of maintaining a broadband connection uninterrupted are the same. For example, the receiving unit 1101 and the processing unit 1102 of the apparatus 110 may alternatively be combined into a communication unit. Usually, each unit corresponds to respective program code (or program instructions). When the program code corresponding to the unit is run on a processor, the unit executes a corresponding procedure to implement a corresponding function.

In some specific implementations, the apparatus 110 for maintaining a broadband connection uninterrupted may be the SDN controller in the embodiments shown in FIG. 4 to FIG. 10. The units are described as follows.

The receiving unit 1101 is configured to receive a first migration request, where the first migration request is used to request to migrate user traffic from a first vBNG-UP to a second vBNG-UP when the first vBNG-UP is faulty. For a specific implementation, refer to detailed descriptions of step S405 in the embodiment shown in FIG. 4, step S504 in the embodiment shown in FIG. 5, step S607 in the embodiment shown in FIG. 6, step S707 in the embodiment shown in FIG. 7, and step S807 in the embodiment shown in FIG. 8. Details are not described herein again.

The processing unit 1102 is configured to control an SF to migrate the user traffic from the first vBNG-UP to the second vBNG-UP. For a specific implementation, refer to detailed descriptions of step S607 in the embodiment shown in FIG. 6. Details are not described herein again.

It can be learned that the SDN controller may migrate the user traffic from the first vBNG-UP to the second vBNG-UP when the first vBNG-UP is faulty, to ensure that a user does not perceive the fault of the first vBNG-UP, maintain a broadband connection of the user uninterrupted, and improve user satisfaction.

In another specific implementation, before the receiving unit 1101 is configured to receive the first migration request, the receiving unit is further configured to obtain fault information of the first vBNG-UP. For a specific implementation, refer to detailed descriptions of step S601 in the embodiment shown in FIG. 6 and step S801 in the embodiment shown in FIG. 8. Details are not described herein again. The apparatus 110 further includes a sending unit 1103 configured to send first notification information to a USF, where the first notification information is used to notify that the first vBNG-UP is faulty. For a specific implementation, refer to detailed descriptions of step S602 in the embodiment shown in FIG. 6 and step S802 in the embodiment shown in FIG. 8. Details are not described herein again.

In still another possible implementation, the receiving unit 1101 is further configured to receive the first migration request from a vBNG-CP. For a specific implementation, refer to detailed descriptions of step S806 in the embodiment shown in FIG. 8. Details are not described herein again.

In still another possible implementation, the receiving unit 1101 is further configured to receive the first migration request from the USF. For a specific implementation, refer to detailed descriptions of step S607 in the embodiment shown in FIG. 6 and step S707 in the embodiment shown in FIG. 7. Details are not described herein again.

In still another possible implementation, the processing unit 1102 is further configured to send path information of the second vBNG-UP to the SF, to control the SF to migrate the user traffic from the first vBNG-UP to the second vBNG-UP, where the path information is used by the SF to migrate the user traffic from the first vBNG-UP to the second vBNG-UP. For a specific implementation, refer to detailed descriptions of step S405 in the embodiment shown in FIG. 4 and step S505 in the embodiment shown in FIG. 5. Details are not described herein again.

In still another possible implementation, the processing unit 1102 is further configured to control the SF to bind a VLAN or a QinQ corresponding to a user to an interface corresponding to the second vBNG-UP, to migrate the user traffic from the first vBNG-UP to the second vBNG-UP. For a specific implementation, refer to detailed descriptions of step S607 in the embodiment shown in FIG. 6 and step S707 in the embodiment shown in FIG. 7. Details are not described herein again.

It should be noted that, for implementations and beneficial effects of the units, refer to corresponding descriptions in the method embodiments shown in FIG. 4 to FIG. 10.

Figure 12:
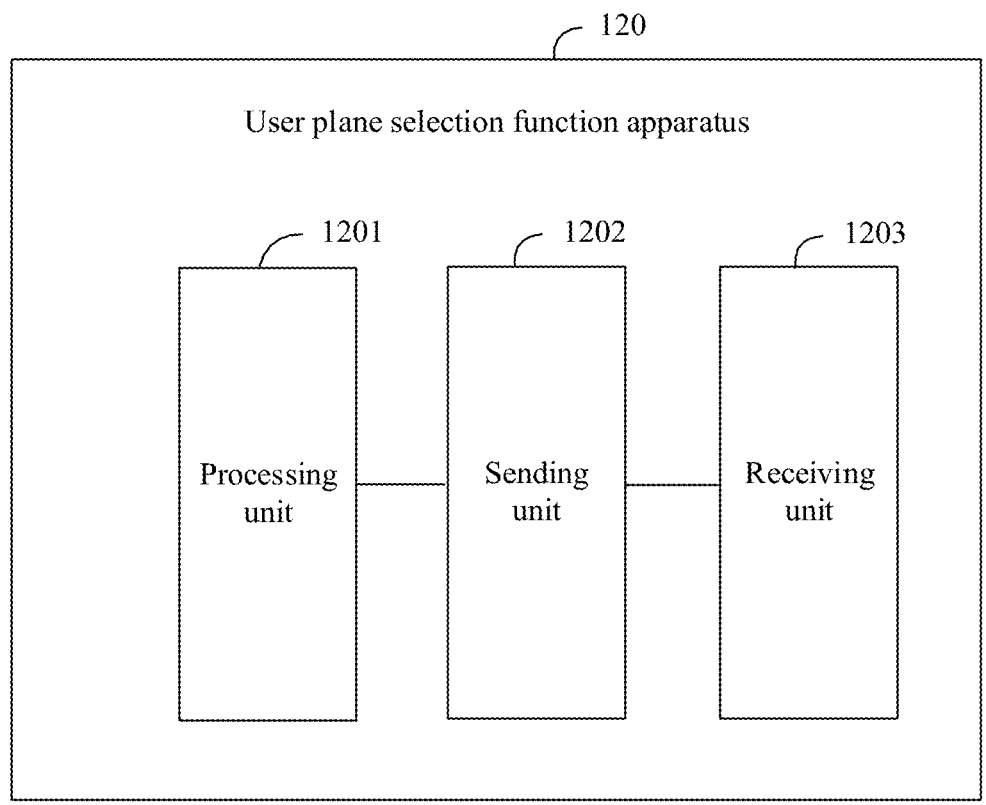
FIG. 12 is a schematic diagram of a structure of a USF apparatus according to an embodiment of this application.

FIG. 12 is a schematic diagram of a structure of a USF apparatus 120 according to an embodiment of this application. The apparatus 120 may be a node, or may be a component in the node, for example, a chip or an integrated circuit. The apparatus 120 may include a processing unit 1201 and a sending unit 1202. The apparatus 120 for maintaining a broadband connection uninterrupted is configured to implement the foregoing method for maintaining a broadband connection uninterrupted, for example, the method for maintaining a broadband connection uninterrupted according to any embodiment shown in FIG. 4 to FIG. 10.

It should be understood that, in the apparatus embodiments of this application, division into a plurality of units or modules is merely logical division based on functions, and is not intended to limit a specific structure of the apparatus. In a specific implementation, some functional modules may be further divided into more fine functional modules, and some functional modules may be combined into one functional module. However, regardless of whether the functional modules are further divided or combined, general procedures performed by the apparatus 120 in a process of maintaining a broadband connection uninterrupted are the same. Usually, each unit corresponds to respective program code (or program instructions). When the program code corresponding to the unit is run on a processor, the unit executes a corresponding procedure to implement a corresponding function.

In some possible implementations, the USF apparatus 120 may be the USF in the embodiments shown in FIG. 4 to FIG. 10. The units are described as follows.

The processing unit 1201 is configured to determine a second vBNG-UP, where the second vBNG-UP is a vBNG-UP that replaces a first vBNG-UP to enable a user to access a network after the first vBNG-UP is faulty. For a specific implementation, refer to detailed descriptions of step S401 in the embodiment shown in FIG. 4 and step S501 in the embodiment shown in FIG. 5. Details are not described herein again.

The sending unit 1202 is configured to send first indication information to a vBNG-CP, where the first indication information indicates the second vBNG-UP that replaces the first vBNG-UP when the first vBNG-UP is faulty. For a specific implementation, refer to detailed descriptions of step S402 in the embodiment shown in FIG. 4, step S502 in the embodiment shown in FIG. 5, step S603 in the embodiment shown in FIG. 6, step S703 in the embodiment shown in FIG. 7, step S803 in the embodiment shown in FIG. 8, and step S903 in the embodiment shown in FIG. 9. Details are not described herein again.

It can be learned that the USF may determine, based on various requirements, a target user plane that meets load balancing, so that the target user plane (the second vBNG-UP) may replace the faulty vBNG-UP when the first vBNG- UP is faulty. This improves network utilization and efficiency, and improves user satisfaction.

In another possible implementation, before the processing unit 1201 is configured to determine the second vBNG-UP, the apparatus further includes a receiving unit 1203 configured to receive a first notification message, where the first notification message is used to notify that the first vBNG-UP is faulty. For a specific implementation, refer to detailed descriptions of step S602 in the embodiment shown in FIG. 6, step S702 in the embodiment shown in FIG. 7, step S802 in the embodiment shown in FIG. 8, and step S902 in the embodiment shown in FIG. 9. Details are not described herein again.

In still another possible implementation, after the processing unit 1201 is configured to determine the second vBNG-UP, the sending unit 1202 is further configured to send a first migration request to a SDN controller, where the first migration request is used to request to migrate user traffic from the first vBNG-UP to the second vBNG-UP when the first vBNG-UP is faulty. For a specific implementation, refer to detailed descriptions of step S404 in the embodiment shown in FIG. 4 and step S503 in the embodiment shown in FIG. 5. Details are not described herein again. In still another possible implementation, after the sending unit 1202 is configured to send the first indication information to the vBNG-CP, the receiving unit 1203 is further configured to receive a second notification message from the vBNG-CP, where the second notification message indicates that the vBNG-CP has sent a user entry to the second vBNG-UP. For a specific implementation, refer to detailed descriptions of step S605 in the embodiment shown in FIG. 6 and step S705 in the embodiment shown in FIG. 7. Details are not described herein again.

The sending unit 1202 is further configured to send a first migration request to an SDN controller based on the second notification message, where the first migration request is used by the SDN controller to migrate user traffic from the first vBNG-UP to the second vBNG-UP, the user entry is information indicating that the user accesses the network through the second vBNG-UP, and the user entry is used by the second vBNG-UP to maintain a broadband connection of the user when the first vBNG-UP is faulty. For a specific implementation, refer to detailed descriptions of step S606 in the embodiment shown in FIG. 6 and step S706 in the embodiment shown in FIG. 7. Details are not described herein again.

In still another possible implementation, the receiving unit 1203 is further configured to receive the first notification message from the vBNG-CP. For a specific implementation, refer to step S603 in the embodiment shown in FIG. 6 and step S803 in the embodiment shown in FIG. 8. Details are not described herein again.

In still another possible implementation, the receiving unit 1203 is further configured to receive the first notification message from an SDN controller. For a specific implementation, refer to detailed descriptions of step S703 in the embodiment shown in FIG. 7 and step S903 in the embodiment shown in FIG. 9. Details are not described herein again.

In still another possible implementation, the processing unit 1201 is further configured to determine the second vBNG-UP from a plurality of vBNG-UPs based on an SLA. For a specific implementation, refer to step S401 in the embodiment shown in FIG. 4 and step S501 in the embodiment shown in FIG. 5. Details are not described herein again.

It should be noted that, for implementations and beneficial effects of the units, refer to corresponding descriptions in the method embodiments shown in FIG. 4 to FIG. 10.

Figure 13:
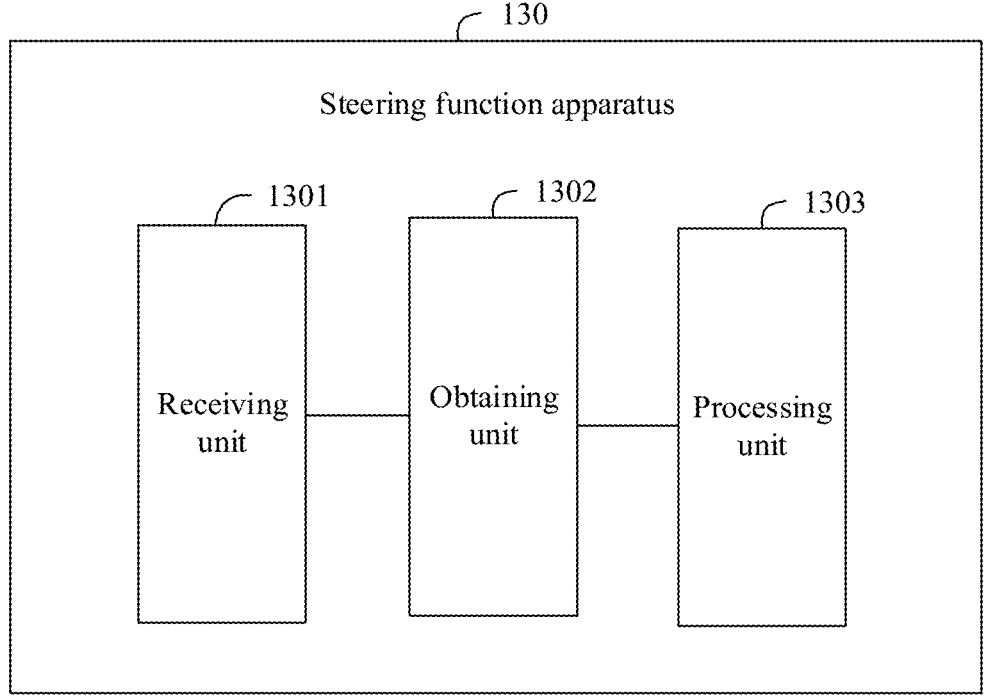
FIG. 13 is a schematic diagram of a structure of an SF apparatus according to an embodiment of this application.

FIG. 13 is a schematic diagram of a structure of an SF apparatus 130 according to an embodiment of this application. The apparatus 130 may be a node, or may be a component in the node, for example, a chip or an integrated circuit. The apparatus 130 may include a receiving unit 1301, an obtaining unit 1302, and a processing unit 1303. The apparatus 130 for maintaining a broadband connection uninterrupted is configured to implement the foregoing method for maintaining a broadband connection uninterrupted, for example, the method for maintaining a broadband connection uninterrupted according to any embodiment shown in FIG. 4 to FIG. 10.

It should be understood that, in the apparatus embodiments of this application, division into a plurality of units or modules is merely logical division based on functions, and is not intended to limit a specific structure of the apparatus. In a specific implementation, some functional modules may be further divided into more fine functional modules, and some functional modules may be combined into one functional module. However, regardless of whether the functional modules are further divided or combined, general procedures performed by the apparatus 130 in a process of maintaining a broadband connection uninterrupted are the same. Usually, each unit corresponds to respective program code (or program instructions). When the program code corresponding to the unit is run on a processor, the unit executes a corresponding procedure to implement a corresponding function.

In some possible implementations, the apparatus 130 for maintaining a broadband connection uninterrupted may be the SF in the embodiments shown in FIG. 4 to FIG. 10. The units are described as follows.

The receiving unit 1301 is configured to receive path information sent by an SDN controller, where the path information indicates to migrate user traffic from a first vBNG-UP to a second vBNG-UP when the first vBNG-UP is faulty. For a specific implementation, refer to detailed descriptions of step S405 in the embodiment shown in FIG. 4 and step S705 in the embodiment shown in FIG. 7. Details are not described herein again.

The obtaining unit 1302 is configured to obtain fault information of the first vBNG-UP. For a specific implementation, refer to detailed descriptions of step S406 in the embodiment shown in FIG. 4 and step S706 in the embodiment shown in FIG. 7. Details are not described herein again.

The processing unit 1303 is configured to migrate the user traffic from the first vBNG-UP to the second vBNG-UP based on the path information. For a specific implementation, refer to detailed descriptions of step S404 in the embodiment shown in FIG. 4 and step S704 in the embodiment shown in FIG. 7. Details are not described herein again.

It can be learned that the SF may monitor a status of a connection to the first vBNG-UP in real time, so that the SF can perceive, in real time, that the first vBNG-UP is faulty. When the first vBNG-UP is faulty, the user traffic can be quickly migrated from the faulty first vBNG-UP to a target user plane (the second vBNG-UP). Traffic migration is completed when a user does not perceive the fault of the first vBNG-UP, to improve user experience.

In another possible implementation, the processing unit 1303 is further configured to bind, based on the path information, a VLAN or a QinQ corresponding to a user to an interface corresponding to the second vBNG-UP, to complete migration of the user traffic from the first vBNG-UP to the second vBNG-UP. For a specific implementation, refer to detailed descriptions of step S607 in the embodiment shown in FIG. 6, step S806 in the embodiment shown in FIG. 8, and step S906 in the embodiment shown in FIG. 9. Details are not described herein again.

It should be noted that, for implementations and beneficial effects of the units, refer to corresponding descriptions in the method embodiments shown in FIG. 4 to FIG. 10.

Figure 14:
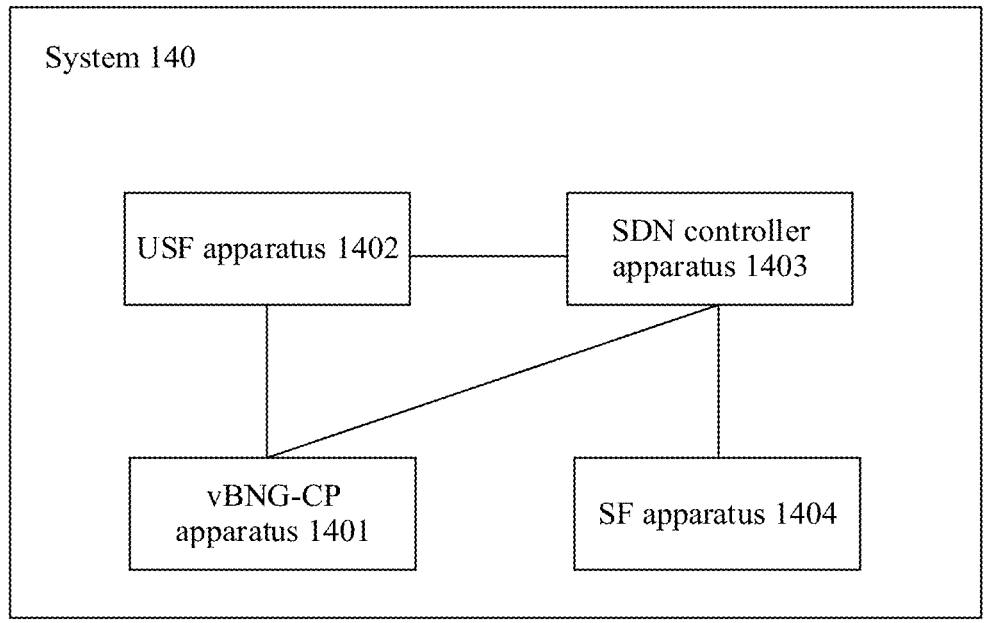
FIG. 14 is a schematic diagram of a structure of a broadband connection system according to an embodiment of this application.

FIG. 14 is a schematic diagram of a broadband connection system 140 according to an embodiment of this application. The system 140 includes a vBNG-CP apparatus 1401 and a USF apparatus 1402. The system units are described as follows.

The USF apparatus is configured to send first indication information to the vBNG-CP apparatus, where the first indication information indicates a second vBNG-UP that replaces a first vBNG-UP when the first vBNG-UP is faulty. For a specific implementation, refer to detailed descriptions of step S402 in the embodiment shown in FIG. 4 and step S502 in the embodiment shown in FIG. 5. Details are not described herein again.

The vBNG-CP apparatus is configured to send a user entry to the second vBNG-UP based on the first indication information, where the user entry is used by the second vBNG-UP to enable a user to access a network based on the user entry when the first vBNG-UP is faulty. For a specific implementation, refer to detailed descriptions of step S408 in the embodiment shown in FIG. 4 and step S509 in the embodiment shown in FIG. 5. Details are not described herein again.

In a specific implementation, the system further includes an SDN controller apparatus 1403 configured to receive a first migration request, where the first migration request is used to request to migrate user traffic from the first vBNG-UP to the second vBNG-UP when the first vBNG-UP is faulty, and a SF apparatus 1404 configured to migrate the user traffic from the first vBNG-UP to the second vBNG-UP based on path information, where the path information indicates to migrate the user traffic from the first vBNG-UP to the second vBNG-UP when the first vBNG-UP is faulty.

In a specific implementation, before the USF apparatus is configured to send the first indication information to the vBNG-CP apparatus, the vBNG-CP apparatus is further configured to obtain fault information of the first vBNG-UP. For a specific implementation, refer to detailed descriptions of step S402 in the embodiment shown in FIG. 4 and step S502 in the embodiment shown in FIG. 5. Details are not described herein again.

The vBNG-CP apparatus is further configured to send first notification information to the USF, where the first notification information is used to notify that the first vBNG-UP is faulty. For a specific implementation, refer to detailed descriptions of step S602 in the embodiment shown in FIG. 6 and step S802 in the embodiment shown in FIG. 8. Details are not described herein again.

In a specific implementation, after the USF apparatus is configured to send the first indication information to the vBNG-CP apparatus, and before the vBNG-CP apparatus is configured to send the user entry to the second vBNG-UP based on the first indication information, the vBNG-CP apparatus is further configured to obtain fault information of the first vBNG-UP. For a specific implementation, refer to detailed descriptions of step S406 in the embodiment shown in FIG. 4 and step S706 in the embodiment shown in FIG. 7. Details are not described herein again.

In a specific implementation, after the USF apparatus is configured to send the first indication information to the vBNG-CP apparatus, and before the vBNG-CP apparatus is configured to send the user entry to the second vBNG-UP based on the first indication information, the vBNG-CP apparatus is further configured to receive a notification message sent by the second vBNG-UP after user traffic is migrated from the first vBNG-UP to the second vBNG-UP, where the notification message indicates the vBNG-CP to send the user entry to the second vBNG-UP. For a specific implementation, refer to step S508 in the embodiment shown in FIG. 5. Details are not described herein again.

In a specific implementation, after the vBNG-CP apparatus is configured to send the user entry to the second vBNG-UP based on the first indication information, the vBNG-CP apparatus is further configured to send a first migration request to a SDN controller, where the first migration request is used to request to migrate user traffic from the first vBNG-UP to the second vBNG-UP. For a specific implementation, refer to detailed descriptions of step S404 in the embodiment shown in FIG. 4, step S704 in the embodiment shown in FIG. 7, and step S904 in the embodiment shown in FIG. 9. Details are not described herein again.

In a specific implementation, after the vBNG-CP apparatus is configured to send the user entry to the second vBNG-UP based on the first indication information, the vBNG-CP apparatus is further configured to send, to the USF, a notification message indicating that the user entry is successfully migrated, where the notification message is used by the USF to trigger an SDN controller to migrate user traffic from the first vBNG-UP to the second vBNG-UP. For a specific implementation, refer to step S605 in the embodiment shown in FIG. 6. Details are not described herein again.

In a specific implementation, the USF apparatus is further configured to determine the second vBNG-UP. For a specific implementation, refer to detailed descriptions of step S401 in the embodiment shown in FIG. 4 and step S501 in the embodiment shown in FIG. 5. Details are not described herein again.

In a specific implementation, before the USF apparatus is configured to determine the second vBNG-UP, the USF apparatus is further configured to receive a first notification message, where the first notification message is used to notify that the first vBNG-UP is faulty. For a specific implementation, refer to detailed descriptions of step S602 in the embodiment shown in FIG. 6 and step S802 in the embodiment shown in FIG. 8. Details are not described herein again.

In a specific implementation, after the USF apparatus is configured to determine the second vBNG-UP, the USF apparatus is further configured to send a first migration request to a SDN controller, where the first migration request is used to request to migrate user traffic from the first vBNG-UP to the second vBNG-UP when the first vBNG-UP is faulty. For a specific implementation, refer to detailed descriptions of step S404 in the embodiment shown in FIG. 4, step S704 in the embodiment shown in FIG. 7, and step S904 in the embodiment shown in FIG. 9. Details are not described herein again.

In a specific implementation, after the USF apparatus is configured to determine the second vBNG-UP, the USF apparatus is further configured to receive a second notification message from the vBNG-CP, where the second notification message indicates that the vBNG-CP has sent a user entry to the second vBNG-UP. For a specific implementation, refer to detailed descriptions of step S602 in the embodiment shown in FIG. 6 and step S802 in the embodiment shown in FIG. 8. Details are not described herein again.

The USF apparatus is further configured to send a first migration request to an SDN controller based on the second notification message, where the first migration request is used by the SDN controller to migrate user traffic from the first vBNG-UP to the second vBNG-UP, the user entry is information indicating that the user accesses the network through the second vBNG-UP, and the user entry is used by the second vBNG-UP to maintain a broadband connection of the user when the first vBNG-UP is faulty. For a specific implementation, refer to step S606 in the embodiment shown in FIG. 6. Details are not described herein again.

In a specific implementation, the USF apparatus is further configured to determine the second vBNG-UP from a plurality of vBNG-UPs based on an SLA. For a specific implementation, refer to step S401 in the embodiment shown in FIG. 4 and step S501 in the embodiment shown in FIG. 5. Details are not described herein again.

In a specific implementation, before the SDN controller is configured to receive the first migration request, the SDN controller is further configured to obtain fault information of the first vBNG-UP.

The SDN controller is further configured to send first notification information to the USF, where the first notification information is used to notify that the first vBNG-UP is faulty. For a specific implementation, refer to detailed descriptions of step S602 in the embodiment shown in FIG. 6 and step S802 in the embodiment shown in FIG. 8. Details are not described herein again.

In a specific implementation, the SDN controller is further configured to control an SF to migrate the user traffic from the first vBNG-UP to the second vBNG-UP. For a specific implementation, refer to detailed descriptions of step S607 in the embodiment shown in FIG. 6. Details are not described herein again.

In a specific implementation, the SDN controller is further configured to send path information of the second vBNG-UP to the SF, to control the SF to migrate the user traffic from the first vBNG-UP to the second vBNG-UP, where the path information is used by the SF to migrate the user traffic from the first vBNG-UP to the second vBNG-UP. For a specific implementation, refer to detailed descriptions of step S405 in the embodiment shown in FIG. 4 and step S705 in the embodiment shown in FIG. 7. Details are not described herein again.

In a specific implementation, the SDN controller is further configured to control the SF to bind a VLAN or a QinQ corresponding to a user to an interface corresponding to the second vBNG-UP, to migrate the user traffic from the first vBNG-UP to the second vBNG-UP. For a specific implementation, refer to detailed descriptions of step S607 in the embodiment shown in FIG. 6 and step S806 in the embodiment shown in FIG. 8. Details are not described herein again.

In a specific implementation, the SF is further configured to receive the path information sent by the SDN controller. For a specific implementation, refer to detailed descriptions of step S405 in the embodiment shown in FIG. 4 and step S705 in the embodiment shown in FIG. 7. Details are not described herein again.

In a specific implementation, the SF is further configured to obtain fault information of the first vBNG-UP. For a specific implementation, refer to detailed descriptions of step S406 in the embodiment shown in FIG. 4 and step S706 in the embodiment shown in FIG. 7. Details are not described herein again.

In a specific implementation, the SF is further configured to bind, based on the path information, a VLAN or a QinQ corresponding to a user to an interface corresponding to the second vBNG-UP, to complete migration of the user traffic from the first vBNG-UP to the second vBNG-UP. For a specific implementation, refer to detailed descriptions of step S607 in the embodiment shown in FIG. 6, step S806 in the embodiment shown in FIG. 8, and step S906 in the embodiment shown in FIG. 9. Details are not described herein again.

It should be noted that, for implementations and beneficial effects of the units, refer to corresponding descriptions in the method embodiments shown in FIG. 4 to FIG. 9.

Figure 15:
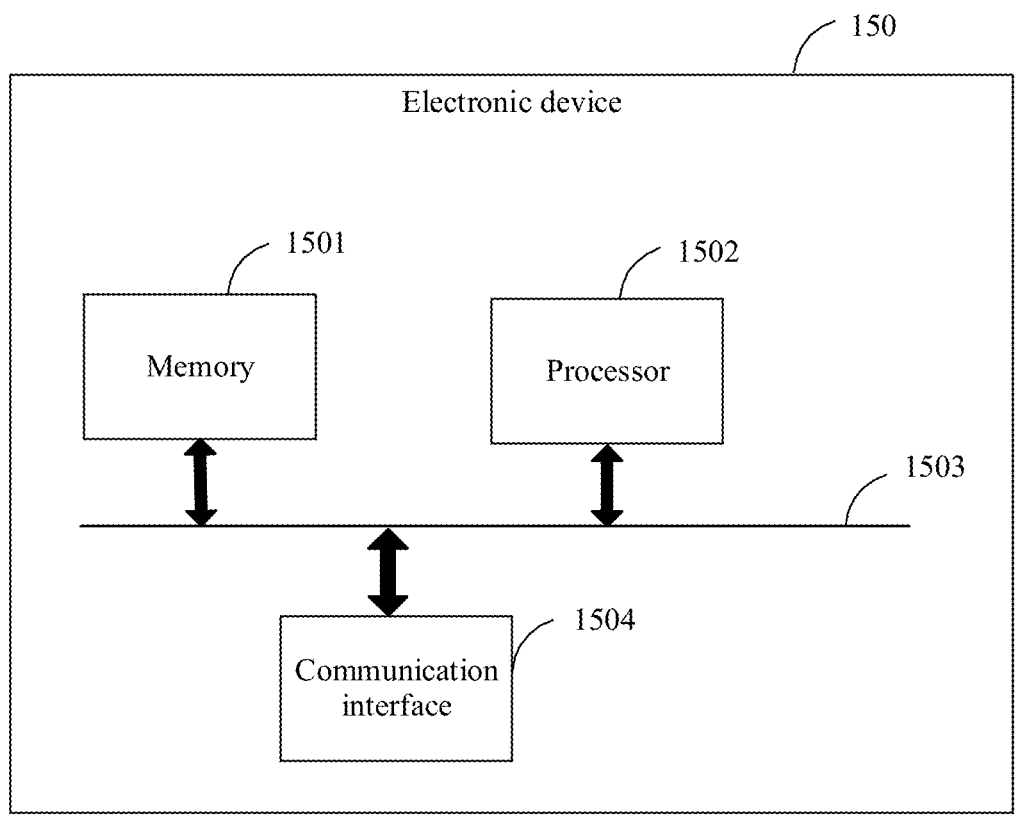
FIG. 15 is a schematic diagram of a structure of an electronic device according to an embodiment of this application.

FIG. 15 is a schematic diagram of a structure of an electronic device 150 according to an embodiment of this application. The device 150 may be a node, or may be a component in the node, for example, a chip or an integrated circuit. The device 150 may include at least one memory 1501 and at least one processor 1502. Optionally, a bus 1503 may be further included. Further optionally, the device may further include a communication interface 1504. The memory 1501, the processor 1502, and the communication interface 1504 are connected by using the bus 1503.

The memory 1501 is configured to provide storage space, and the storage space may store data such as an operating system and a computer program. The memory 1501 may be one or a combination of a random-access memory (RAM), a read-only memory (ROM), an erasable programmable ROM (EPROM), a portable ROM (e.g., compact disc (CD) ROM (CD-ROM)), or the like.

The processor 1502 is a module that performs an arithmetic operation and/or a logic operation, and may be further one or a combination of processing modules such as a central processing unit (CPU), a graphics processing unit (GPU), a microprocessor unit (VIPU), an application-specific integrated circuit (ASIC), a field-programmable gate array (FPGA), and a complex programmable logic device (CPLD).

The communication interface 1504 is configured to receive data sent by an external device and/or send data to an external device, and may be a wired link interface such as an Ethernet cable, or may be a wireless (for example, WI-FI, BLUETOOTH, or general wireless transmission) link interface. Optionally, the communication interface 1504 may further include a transmitter (for example, a radio frequency transmitter or an antenna), a receiver, or the like coupled to the interface.

The processor 1502 in the device 150 is configured to read the computer program stored in the memory 1501, and is configured to perform the foregoing method for maintaining a broadband connection uninterrupted, for example, the method for maintaining a broadband connection uninterrupted described in any embodiment of FIG. 4 to FIG. 10.

In some possible implementations, the electronic device 150 may be the vBNG-CP device in the embodiments shown in FIG. 4 to FIG. 10. The processor 1502 in the device 150 is configured to read the computer program stored in the memory 1501, to perform the following operations.

First indication information is received from a USF through the communication interface 1504, where the first indication information indicates a second vBNG-UP that replaces a first vBNG-UP when the first vBNG-UP is faulty. For a specific implementation, refer to detailed descriptions of step S402 in the embodiment shown in FIG. 4 and step S502 in the embodiment shown in FIG. 5. Details are not described herein again.

A user entry is sent to the second vBNG-UP based on the first indication information through the communication interface 1504, where the user entry is used by the second vBNG-UP to enable a user to access a network based on the user entry when the first vBNG-UP is faulty. For a specific implementation, refer to detailed descriptions of step S408 in the embodiment shown in FIG. 4 and step S509 in the embodiment shown in FIG. 5. Details are not described herein again.

It can be learned that the vBNG-CP may obtain, in advance, a target user plane (the second vBNG-UP) to which the user affected by a fault of a first user plane needs to be migrated. Therefore, the vBNG-CP may send the user entry to the second vBNG-UP in advance. In this way, when the first user plane is faulty, time for sending the user entry to the second vBNG-UP can be reduced, and a speed of steering user traffic from the first vBNG-UP to the second vBNG-UP can be improved.

In a possible implementation, before receiving the first indication information from the USF through the communication interface 1504, the processor 1502 is further configured to obtain fault information of the first vBNG-UP through the communication interface 1504. The vBNG-CP sends first notification information to the USF, where the first notification information is used to notify that the first vBNG-UP is faulty. For a specific implementation, refer to detailed descriptions of step S602 in the embodiment shown in FIG. 6 and step S802 in the embodiment shown in FIG. 8. Details are not described herein again.

It can be learned that the vBNG-CP may monitor a status of a connection to the first vBNG-UP in real time, so that the vBNG-CP can perceive, in real time, that the first vBNG-UP is faulty. When the first vBNG-UP is faulty, the vBNG-CP may send a fault message to the USF, so that the USF can query the target user plane for migration.

In a possible implementation, after the first indication information from the USF is received through the communication interface 1504, and before the user entry is sent to the second vBNG-UP through the communication interface 1504 based on the first indication information, the processor 1502 is further configured to obtain fault information of the first vBNG-UP. For a specific implementation, refer to detailed descriptions of step S406 in the embodiment shown in FIG. 4 and step S706 in the embodiment shown in FIG. 7. Details are not described herein again.

In a possible implementation, after the first indication information from the USF is received through the communication interface 1504, and before the user entry is sent to the second vBNG-UP through the communication interface 1504 based on the first indication information, the processor 1502 is further configured to receive, through the communication interface 1504, a notification message sent by the second vBNG-UP after user traffic is migrated from the first vBNG-UP to the second vBNG-UP, where the notification message indicates the vBNG-CP to send the user entry to the second vBNG-UP. For a specific implementation, refer to step S508 in the embodiment shown in FIG. 5. Details are not described herein again.

In a possible implementation, after sending the user entry to the second vBNG-UP based on the first indication information through the communication interface 1504, the processor 1502 is further configured to send a first migration request to an SDN controller through the communication interface 1504, where the first migration request is used to request to migrate user traffic from the first vBNG-UP to the second vBNG-UP.

In a possible implementation, after sending the user entry to the second vBNG-UP based on the first indication information through the communication interface 1504, the processor 1502 is further configured to send, to the USF through the communication interface 1504, a notification message indicating that the user entry is successfully migrated, where the notification message is used by the USF to trigger an SDN controller to migrate user traffic from the first vBNG-UP to the second vBNG-UP. For a specific implementation, refer to detailed descriptions of step S404 in the embodiment shown in FIG. 4, step S704 in the embodiment shown in FIG. 7, and step S904 in the embodiment shown in FIG. 9. Details are not described herein again.

In some possible implementations, the electronic device 150 may be the SDN controller device in the embodiments shown in FIG. 4 to FIG. 10. The processor 1502 in the device 150 is configured to read the computer program stored in the memory 1501, to perform the following operations.

A first migration request is received through the communication interface 1504, where the first migration request is used to request to migrate user traffic from the first vBNG-UP to the second vBNG-UP when the first vBNG-UP is faulty. For a specific implementation, refer to detailed descriptions of step S404 in the embodiment shown in FIG. 4, step S808 in the embodiment shown in FIG. 8, and step S905 in the embodiment shown in FIG. 9. Details are not described herein again.

An SF is controlled to migrate the user traffic from the first vBNG-UP to the second vBNG-UP. For a specific implementation, refer to detailed descriptions of step S607 in the embodiment shown in FIG. 6. Details are not described herein again.

It can be learned that the SDN controller may migrate the user traffic from the first vBNG-UP to the second vBNG-UP when the first vBNG-UP is faulty, to ensure that a user does not perceive the fault of the first vBNG-UP, maintain a broadband connection of the user uninterrupted, and improve user satisfaction.

In a possible implementation, before receiving the first migration request through the communication interface 1504, the processor 1502 is further configured to obtain fault information of the first vBNG-UP, and send first notification information to the USF through the communication interface 1504, where the first notification information is used to notify that the first vBNG-UP is faulty. For a specific implementation, refer to detailed descriptions of step S602 in the embodiment shown in FIG. 6 and step S802 in the embodiment shown in FIG. 8. Details are not described herein again.

It can be learned that the SDN controller may monitor a status of a connection to the first vBNG-UP in real time, so that the SDN controller can perceive, in real time, that the first vBNG-UP is faulty. When the first vBNG-UP is faulty, the SDN controller may send a fault message to the USF, so that the USF can query the target user plane for migration.

In a possible implementation, the processor 1502 is further configured to receive the first migration request from the vBNG-CP through the communication interface 1504. For a specific implementation, refer to detailed descriptions of step S805 in the embodiment shown in FIG. 8. Details are not described herein again.

In a possible implementation, the processor 1502 is further configured to receive the first migration request from the USF through the communication interface 1504. For a specific implementation, refer to step S606 in the embodiment shown in FIG. 6. Details are not described herein again.

In a possible implementation, the processor 1502 is further configured to send path information of the second vBNG-UP to the SF through the communication interface 1504, to control the SF to migrate the user traffic from the first vBNG-UP to the second vBNG-UP, where the path information is used by the SF to migrate the user traffic from the first vBNG-UP to the second vBNG-UP. For a specific implementation, refer to detailed descriptions of step S405 in the embodiment shown in FIG. 4 and step S705 in the embodiment shown in FIG. 7. Details are not described herein again.

In a possible implementation, the processor 1502 is further configured to control the SF to bind a VLAN or a QinQ corresponding to a user to an interface corresponding to the second vBNG-UP, to migrate the user traffic from the first vBNG-UP to the second vBNG-UP. For a specific implementation, refer to detailed descriptions of step S607 in the embodiment shown in FIG. 6 and step S806 in the embodiment shown in FIG. 8. Details are not described herein again.

In some possible implementations, the electronic device 150 may be the USF device in the embodiments shown in FIG. 4 to FIG. 10. The processor 1502 in the device 150 is configured to read the computer program stored in the memory 1501, to perform the following operations.

The second vBNG-UP is determined, where the second vBNG-UP is a vBNG-UP that replaces the first vBNG-UP to enable a user to access a network after the first vBNG-UP is faulty. For a specific implementation, refer to detailed descriptions of step S401 in the embodiment shown in FIG. 4 and step S501 in the embodiment shown in FIG. 5. Details are not described herein again. The USF sends first indication information to a vBNG-CP, where the first indication information indicates the second vBNG-UP that replaces the first vBNG-UP when the first vBNG-UP is faulty. For a specific implementation, refer to detailed descriptions of step S402 in the embodiment shown in FIG. 4 and step S502 in the embodiment shown in FIG. 5. Details are not described herein again.

It can be learned that the USF may determine, based on various requirements, a target user plane that meets load balancing, so that the target user plane (the second vBNG-UP) may replace the faulty vBNG-UP when the first vBNG-UP is faulty. This improves network utilization and efficiency, and improves user satisfaction.

In a possible implementation, before determining the second vBNG-UP, the processor 1502 is further configured to receive a first notification message through the communication interface 1504, where the first notification message is used to notify that the first vBNG-UP is faulty. For a specific implementation, refer to detailed descriptions of step S602 in the embodiment shown in FIG. 6 and step S802 in the embodiment shown in FIG. 8. Details are not described herein again.

In a possible implementation, after the USF determines the second vBNG-UP, the processor 1502 is further configured to send a first migration request to an SDN controller through the communication interface 1504, where the first migration request is used to request to migrate user traffic from the first vBNG-UP to the second vBNG-UP when the first vBNG-UP is faulty. For a specific implementation, refer to detailed descriptions of step S404 in the embodiment shown in FIG. 4, step S704 in the embodiment shown in FIG. 7, and step S904 in the embodiment shown in FIG. 9. Details are not described herein again.

In a possible implementation, after determining the second vBNG-UP, the processor 1502 is further configured to receive a second notification message from the vBNG-CP through the communication interface 1504, where the second notification message indicates that the vBNG-CP has sent a user entry to the second vBNG-UP. For a specific implementation, refer to detailed descriptions of step S602 in the embodiment shown in FIG. 6 and step S802 in the embodiment shown in FIG. 8. Details are not described herein again.

The USF sends a first migration request to an SDN controller based on the second notification message, where the first migration request is used by the SDN controller to migrate user traffic from the first vBNG-UP to the second vBNG-UP, the user entry is information indicating that the user accesses the network through the second vBNG-UP, and the user entry is used by the second vBNG-UP to maintain a broadband connection of the user when the first vBNG-UP is faulty. For a specific implementation, refer to step S606 in the embodiment shown in FIG. 6. Details are not described herein again.

In a possible implementation, when receiving the first notification message through the communication interface 1504, the processor 1502 is further configured to receive a first notification message from the vBNG-CP. For a specific implementation, refer to step S602 in the embodiment shown in FIG. 6 and step S802 in the embodiment shown in FIG. 8. Details are not described herein again.

In a possible implementation, when receiving the first notification message through the communication interface 1504, the processor 1502 is further configured to receive a first notification message from an SDN controller. For a specific implementation, refer to step S702 in the embodiment shown in FIG. 7 and step S902 in the embodiment shown in FIG. 9. Details are not described herein again.

In a possible implementation, when determining the second vBNG-UP, the processor 1502 is further configured to determine the second vBNG-UP from a plurality of vBNG-UPs based on an SLA. For a specific implementation, refer to step S401 in the embodiment shown in FIG. 4 and step S501 in the embodiment shown in FIG. 5. Details are not described herein again.

In some possible implementations, the electronic device 150 may be the SF device in the embodiments shown in FIG. 4 to FIG. 10. The processor 1502 in the device 150 is configured to read the computer program stored in the memory 1501, to perform the following operations.

Path information sent by an SDN controller is received through the communication interface 1504, where the path information indicates to migrate user traffic from a first vBNG-UP to a second vBNG-UP when the first vBNG-UP is faulty. For a specific implementation, refer to detailed descriptions of step S405 in the embodiment shown in FIG. 4 and step S705 in the embodiment shown in FIG. 7. Details are not described herein again.

Fault information of the first vBNG-UP is obtained. The SF migrates the user traffic from the first vBNG-UP to the second vBNG-UP based on the path information. For a specific implementation, refer to detailed descriptions of step S406 in the embodiment shown in FIG. 4 and step S706 in the embodiment shown in FIG. 7. Details are not described herein again.

It can be learned that the SF may monitor a status of a connection to the first vBNG-UP in real time, so that the SF can perceive, in real time, that the first vBNG-UP is faulty.

When the first vBNG-UP is faulty, the user traffic can be quickly migrated from the faulty first vBNG-UP to a target user plane (the second vBNG-UP). Traffic migration is completed when a user does not perceive the fault of the first vBNG-UP, to improve user experience.

In a possible implementation, the processor 1502 is further configured to bind, based on the path information, a VLAN or a QinQ corresponding to a user to an interface corresponding to the second vBNG-UP, to complete migration of the user traffic from the first vBNG-UP to the second vBNG-UP. For a specific implementation, refer to detailed descriptions of step S607 in the embodiment shown in FIG. 6, step S806 in the embodiment shown in FIG. 8, and step S906 in the embodiment shown in FIG. 9. Details are not described herein again.

It should be noted that, for implementations and beneficial effects of the units, refer to corresponding descriptions in the method embodiments shown in FIG. 4 to FIG. 10.

An embodiment of this application further provides a computer-readable storage medium. The computer-readable storage medium stores a computer program. When the computer program is run on one or more processors, the method described in any embodiment shown in FIG. 4 to FIG. 10 is performed.

An embodiment of this application further provides a chip system. The chip system includes at least one processor, a memory, and an interface circuit. The interface circuit is configured to provide information input/output for the at least one processor. The at least one memory stores a computer program. When the computer program is run on one or more processors, the method described in any embodiment shown in FIG. 4 to FIG. 10 is performed.

An embodiment of this application further provides a computer program product. When the computer program product runs on one or more processors, the method for maintaining a broadband connection uninterrupted described in any embodiment shown in FIG. 4 to FIG. 10 may be performed.

All or some of the foregoing embodiments may be implemented by using software, hardware, firmware, or any combination thereof. When software is used to implement embodiments, all or some of embodiments may be implemented in a form of a computer instruction product. When the computer instructions are loaded and executed on a computer, the procedures or functions according to embodiments of this application are all or partially implemented. The computer may be a general-purpose computer, a special-purpose computer, a computer network, or another programmable apparatus. The computer instructions may be stored in a computer-readable storage medium, or may be transmitted by using a computer-readable storage medium. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, a solid-state disk (SSD)), or the like.

Sequence adjustment, combination, or deletion may be performed on the steps in the method embodiments of this application based on an actual requirement.

Combination, division, and deletion may be performed on the modules in the apparatus embodiments of this application based on an actual requirement.

What is claimed is:

1. A network device comprising:
one or more memories configured to store instructions; and
one or more processors coupled to the one or more memories and configured to execute the instructions to cause the network device to:
receive, from a user plane selection function (USF), indication information indicating a second virtual broadband network gateway (vBNG)-user plane (UP) that replaces a first vBNG-UP prior to the first vBNG-UP being faulty, wherein the first vBNG-UP is faulty when at least one of an interface of the first vBNG-UP is faulty or a connector board of the first vBNG-UP is faulty, and wherein the network device is implemented as the vBNG-CP in a network; and
send, to the second vBNG-UP based on the indication information and prior to the first vBNG-UP being faulty, a user entry, wherein the second vBNG-UP enables user access to the network based on the user entry when the first vBNG-UP is faulty.

2. The network device of claim 1, wherein the one or more processors are further configured to execute the instructions to cause the network device to:
obtain fault information of the first vBNG-UP; and
send, in response to obtaining the fault information, first notification information to the USF for notifying the USF that the first vBNG-UP is faulty.

3. The network device of claim 1, wherein after receiving the indication information and before sending the user entry, the one or more processors are further configured to execute the instructions to cause the network device to obtain fault information of the first vBNG-UP.

4. The network device of claim 1, wherein the one or more processors are further configured to execute the instructions to cause the network device to receive, from the second vBNG-UP after user traffic has been migrated from the first vBNG-UP to the second vBNG-UP, a notification message instructing the network device to send the user entry to the second vBNG-UP.

5. The network device of claim 1, wherein the one or more processors are further configured to execute the instructions to cause the network device to send, to a software-defined networking (SDN) controller, a migration request requesting to migrate user traffic from the first vBNG-UP to the second vBNG-UP.

6. The network device of claim 1, wherein the one or more processors are further configured to execute the instructions to cause the network device to send, to the USF, a notification message indicating that the user entry is successfully migrated to enable the USF to trigger a software-defined networking (SDN) controller to migrate user traffic from the first vBNG-UP to the second vBNG-UP.

7. A network device comprising:
one or more memories configured to store instructions; and
one or more processors coupled to the one or more memories and configured to execute the instructions to cause the network device to:
determine a second virtual broadband network gateway (vBNG)-user plane (UP) that replaces a first vBNG-UP to maintain access of a user to a network prior to the first vBNG-UP being faulty, wherein the first vBNG-UP is faulty when at least one of an interface of the first vBNG-UP is faulty or a connector board of the first vBNG-UP is faulty, wherein the network device is implemented as a user plane selection function (USF) in the network, and wherein the USF predetermines the second vBNG-UP prior to the first vBNG-UP being faulty;

send, to a vBNG-control plane (CP), indication information indicating that the second vBNG-UP replaces the first vBNG-UP when the first vBNG-UP being faulty.

8. The network device of claim 7, wherein the one or more processors are further configured to execute the instructions to cause the network device to receive a notification message indicating that the first vBNG-UP is faulty.

9. The network device of claim 8, wherein the one or more processors are further configured to execute the instructions to cause the network device to further receive, from the vBNG-CP or a software-defined networking (SDN) controller, the notification message.

10. The network device of claim 7, wherein the one or more processors are further configured to execute the instructions to cause the network device to send, to a software-defined networking (SDN) controller, a migration request requesting to migrate user traffic from the first vBNG-UP to the second vBNG-UP when the first vBNG-UP is faulty.

11. The network device of claim 7, wherein the one or more processors are further configured to execute the instructions to cause the network device to:

receive, from the vBNG-CP, a notification message indicating that the vBNG-CP has sent a user entry to the second vBNG-UP, wherein the user entry indicates that the user accesses the network from the second vBNG-UP and enables the second vBNG-UP to maintain the broadband connection of the user when the first vBNG-UP is faulty; and send, to a software-defined networking (SDN) controller based on the notification message, a migration request to enable the SDN controller to migrate user traffic from the first vBNG-UP to the second vBNG-UP.

12. The network device of claim 7, wherein the one or more processors are further configured to execute the instructions to cause the network device to determine, from a plurality of vBNG-UPs based on a service-level agreement (SLA), the second vBNG-UP.

13. The network device of claim 7, wherein the USF is in a software-defined networking (SDN) controller or is an independent apparatus.

14. A communication system comprising:
a first virtual broadband network gateway (vBNG)-user plane (UP);
a second vBNG-UP;
a vBNG-control plane (CP) configured to:
  receive indication information indicating the second vBNG-UP that replaces the first vBNG-UP prior to the first vBNG-UP being faulty, wherein the first vBNG-UP is faulty when at least one of an interface of the first vBNG-UP is faulty or a connector board of the first vBNG-UP is faulty; and
  send, to the second vBNG-UP based on the indication information, a user entry prior to the first vBNG-UP being faulty, wherein the second vBNG-UP enables user access to a network based on the user entry when the first vBNG-UP is faulty; and
a user plane selection function (USF) configured to:
  send the indication information to the vBNG-CP.

15. The communication system of claim 14, wherein the vBNG-CP is further configured to obtain fault information of the first vBNG-UP.

16. The communication system of claim 14, further comprising a software-defined networking (SDN) controller, wherein the vBNG-CP is further configured to send, to the SDN controller, a migration request requesting to migrate user traffic from the first vBNG-UP to the second vBNG-UP.

17. The communication system of claim 14, wherein the USF is further configured to determine the second vBNG-UP.

18. The communication system of claim 14, wherein the USF is further configured to receive, from the vBNG-CP, a notification message notifying that the first vBNG-UP is faulty.

19. The communication system of claim 14, wherein the USF is further configured to send, to a software-defined networking (SDN) controller, a migration request requesting to migrate user traffic from the first vBNG-UP to the second vBNG-UP when the first vBNG-UP is faulty.

20. The communication system of claim 14, wherein the USF is further configured to determine, based on a service-level agreement (SLA), the second vBNG-UP from a plurality of vBNG-UPs.

* * * * *